(12) United States Patent
Johnson

(10) Patent No.: US 9,122,847 B2
(45) Date of Patent: *Sep. 1, 2015

(54) MOBILE DEVICE PERIPHERALS MANAGEMENT SYSTEM AND MULTI-DATA STREAM TECHNOLOGY (MDS)

(71) Applicant: Christopher Bernard Johnson, Spring Hill, TN (US)

(72) Inventor: Christopher Bernard Johnson, Spring Hill, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/500,368

(22) Filed: Sep. 29, 2014

(65) Prior Publication Data

US 2015/0013021 A1  Jan. 8, 2015

Related U.S. Application Data

(63) Continuation-in-part of application No. 13/674,045, filed on Nov. 11, 2012, now Pat. No. 8,850,610.

(60) Provisional application No. 61/674,888, filed on Jul. 24, 2012, provisional application No. 61/558,155, filed on Nov. 10, 2011.

(51) Int. Cl.
*G06F 21/00* (2013.01)
*G06F 21/30* (2013.01)
*G06F 21/70* (2013.01)

(52) U.S. Cl.
CPC ............. *G06F 21/305* (2013.01); *G06F 21/70* (2013.01); *G06F 2221/2129* (2013.01)

(58) Field of Classification Search
CPC ............................... G06F 21/70; G06F 21/305

USPC ........................................................... 726/34
See application file for complete search history.

(56) References Cited

U.S. PATENT DOCUMENTS

| | | | | |
|---|---|---|---|---|
| 5,412,801 | A * | 5/1995 | de Remer et al. | 714/20 |
| 6,038,518 | A * | 3/2000 | Farwell | 702/89 |
| 6,427,173 | B1 * | 7/2002 | Boucher et al. | 709/238 |
| 2002/0124046 | A1 * | 9/2002 | Fischer et al. | 709/201 |
| 2003/0065805 | A1 * | 4/2003 | Barnes, Jr. | 709/231 |
| 2004/0081173 | A1 * | 4/2004 | Feather | 370/395.54 |
| 2004/0137855 | A1 * | 7/2004 | Wiley et al. | 455/88 |
| 2005/0262501 | A1 * | 11/2005 | Marinelli et al. | 717/174 |
| 2006/0061811 | A1 * | 3/2006 | Murakata | 358/1.15 |
| 2008/0057990 | A1 * | 3/2008 | Fuccello et al. | 455/507 |
| 2009/0083834 | A1 * | 3/2009 | Rubinstein et al. | 726/2 |
| 2012/0099476 | A1 * | 4/2012 | Mahaffy et al. | 370/254 |
| 2012/0113458 | A1 * | 5/2012 | Benedek | 358/1.15 |
| 2013/0198360 | A1 * | 8/2013 | Tipnis et al. | 709/223 |

* cited by examiner

*Primary Examiner* — Hadi Armouche
*Assistant Examiner* — Shahriar Zarrineh
(74) *Attorney, Agent, or Firm* — Wayne Edward Ramage; Baker Donelson

(57) ABSTRACT

A device and system for management of and access to externally connected peripheral devices by mobile devices. User and/or application data on a mobile device is sent to externally connected peripheral devices. External peripheral devices includes, but are not limited to, printers, scanners, displays, audio interfaces, speakers, network adapters, storage drives, hard drives, and the like. An end user mobile device application interface is installed as an application on a mobile device. Data may be sent directly to a peripheral device, or to a peripherals aggregation device, which may be active or passive.

7 Claims, 30 Drawing Sheets

MoCo Host – Client Device Sharing Workflow

XLogic Symphony Core Architecture

MoCo Data Transport

MOBILE DEVICE PERIPHERALS MANAGEMENT SYSTEM AND MULTI-DATA STREAM TECHNOLOGY (MDS)

This application is a continuation-in-part application of U.S. patent application Ser. No. 13/674,045, filed Nov. 11, 2012, which claims benefit of and priority to U.S. Provisional Application No. 61/558,155, filed Nov. 10, 2011, by Christopher Bernard Johnson, and U.S. Provisional Application No. 61/674,888, filed Jul. 24, 2012, by Christopher Bernard Johnson, and is entitled to those filing dates for priority in whole or in part. The specification, figures, appendices and complete disclosures of U.S. patent application Ser. No. 13/674,045 and U.S. Provisional Applications Nos. 61/139, 271 and 61/674,888 are incorporated herein in their entireties by specific reference for all purposes.

FIELD OF INVENTION

This invention relates to a system and method for centralized device management and a peripheral access interface for mobile devices.

BACKGROUND OF THE INVENTION

Mobile devices, such as portable computing device, tablets, and smartphones, are currently unable to access non-networked physical peripheral devices, and only a limited set of networked devices. Currently there are no device management applications or solutions for mobile devices to access externally connected peripheral devices.

Accordingly, what is needed is a system for providing mobile devices access to a variety of peripheral devices, whether networked, non-networked, or externally connected.

SUMMARY OF INVENTION

In various embodiments, the present invention comprises a means for management of and access to externally connected peripheral devices by mobile (or remote) devices. The invention takes user and/or application data on a mobile or remote device and sends it to externally connected peripheral devices. External peripheral devices includes, but are not limited to, printers, scanners, displays, audio interfaces, speakers, network adapters, storage drives, hard drives, and the like. Currently, users of prior art systems have to have access to a physical computer (e.g., a computer server or personal computer) to access peripheral devices which are attached or connected to the physical computer. The present invention removes that restriction from users of mobile or remote devices (all references herein to "mobile devices" should be understood to apply to "remote devices" as well).

In one exemplary embodiment, the present invention comprises an end user mobile device application interface installed as an application on a mobile device. The mobile device application may be coded to run on multiple mobile device platforms. The mobile device application makes calls to the mobile device's services and daemons (daemons are computer programs that run as background processes rather than being under the direct control of an interactive user), which in turn access the mobile device manager database or files for drivers for the externally connected peripheral devices. The driver for the selected peripheral then sends the desired data through the mobile device's physical hardware interface, across a connectivity link (wired or wireless) to the peripheral device.

In an alternative embodiment, the data is sent across a connectivity link to a peripherals aggregation device. The peripherals aggregation device may be active or passive. If active, the peripherals aggregation device's operating system and management application processes the data internally (i.e., through its processor or processors and memory), and then sends the processed data through the necessary interface (e.g., USB, IEEE1394, Ethernet, and the like) and to the selected peripheral device. In another embodiment, the peripherals aggregation device's operating system, management application(s), and interfaces also provide a mechanism for data to be exchanged between the connected devices without having to be processed on the host mobile device's hardware components.

In addition to sending user and/or application data from a mobile device to an external peripheral devices, the application also allows a user's applications to access externally connected peripheral devices and retrieve data from them. There are multiple if-then relationships and subroutines based upon the user and/or application requirements and the peripheral devices capabilities.

As part of the mobile device application, the devices management services and/or daemons support multiple peripheral devices and allows for plug-and-play operations for the end users. In one embodiment, the mobile device application is a single management interface to peripherals for users and applications. The mobile device may be equipped with the manufacturer's hardware interface or, alternatively, a proprietary Multi-data Stream (MdS) interface in accordance with an embodiment of the present invention.

Either an open system cable (e.g., USB, or the like) or a Multi-data Stream cable may be used for connectivity between the mobile device and peripheral devices or a peripherals aggregation device. The peripherals aggregation device provides for connectivity of multiple peripheral devices to the mobile device, and may be active or passive, as described above. The peripherals aggregation device may be built using commodity computer components, such as processors, memory, interfaces (e.g., USB, IEEE1394, Ethernet, and the like), or other internal components as required to perform its functions. A custom operating system and management applications allow the peripherals aggregation device to provide advanced features and functionally to the mobile devices for attached peripherals.

In another exemplary embodiment, in addition to permitting a user to use mobile device software and/or its hardware components to access and utilize peripheral devices to perform various functions, the present invention also may be used to provide a mobile user access to a computer-based or network-based services and options (currently described as "cloud" or "online" services). The invention may be used in conjunction with mobile device interfaces, connectivity cables, peripheral aggregation directors and/or switches, and peripheral aggregation hubs. A client application resides on the mobile device, while a host application resides on the external device (e.g., personal computer, computer server, network computer, or a peripherals aggregation device as described above). In one embodiment, the client application or device must be authenticated by the host device, or a separate licensing or sync device. Authentication may be encrypted.

In yet another embodiment, the invention comprises an advanced heterogeneous modular computing system. The system is a combination of tightly integrated computer hardware and software, working together to provide an efficient, powerful, and scalable mobile computing environment. It provides users of mobile computing devices a platform that will allow them to work more efficiently and effectively, without sacrificing the power and advanced features that currently require desktop and workstation class systems. In one exemplary embodiment, an advanced heterogeneous modular computing system includes, but is not limited to, the following components: integrated keyboard; integrated mouse control device; processors (e.g., primary, secondary, control); memory; storage; graphics adapter; network connectors; data interconnects; expansion slots and cards; expansion devices (not exclusively restricted to a particular size, format, or configuration); and power sources. The system provides a unified workspace across heterogeneous platforms; allows the sharing of applications across devices on heterogeneous platforms; and provide the following services and processes: device and peripheral consolidation and sharing; physical data input and mouse control; data synchronization; data optimization and protection; data transport and security; multi-device connectivity; dynamic resource scaling; binary data routing; memory management; mobile device offloading; network access, switching, and routing; application publishing; device publishing; binary routing; data service profiling; CoreGrid resource manager; dynamic data input/output; inter-system data transport; DataLogix encapsulation; client device connections manager; dynamic encryption grid and key manager; file/data block mapping; data protection and optimization manager; network fabric manager; and wireless network transport relay.

When assembled in an end user configuration, an advanced heterogeneous modular computing system serves as a Mobile Cloud Controller ($MC^2$) device for users of mobile and remote computing services and resources. The $MC^2$ comprises multiple heterogeneous computing platforms interconnected within a singular physical device, controlled by a $MC^2$ processing unit, such as the dedicated XLogic $MC^2$ processing unit. The processing unit is the centralized resource manager for internal components and external peripherals connected to the $MC^2$ Device. The processing unit creates and interacts with the Dynamic Data I/O (DDIO) files for physical components and peripherals. DDIO files are presented to the internal computing platforms as the components and peripherals they represent.

In one particular embodiment, the $MC^2$ resource manager provides the virtual memory and storage management system that allocates memory and storage resources to the internal computing systems. The $MC^2$ processing unit provides the interfacing to the XLogic CoreGrid for resource scaling. The resource manager monitors the resource utilization statistics for the internal systems and dynamically allocates or removes resources as required. Because resources are provisioned to internal systems through DDIO files, data is protected from corruption via data integrity caching as it is transferred between the internal systems and the physical components or peripherals. By dynamically adding and removing resources from the internal systems, the $MC^2$ processing unit allows the $MC^2$ device to run more efficiently. Physical resources are powered on or off based upon whether their associated DDIO files are in a 0 or 1 state, 0 for off and 1 for on. The $MC^2$ processing unit also works with an encryption system, such as the ARCSafe Encryption system, to generate dynamic encryption grids and keys for data security. The $MC^2$ device's built-in networking system interfaces with the $MC^2$ processing unit to provide routing, switching, and fabric services. Binary routing is accomplished through the implementation of data service profiling for processing tasks and data types.

DETAILED DESCRIPTION OF EXEMPLARY EMBODIMENTS

Figure 1:
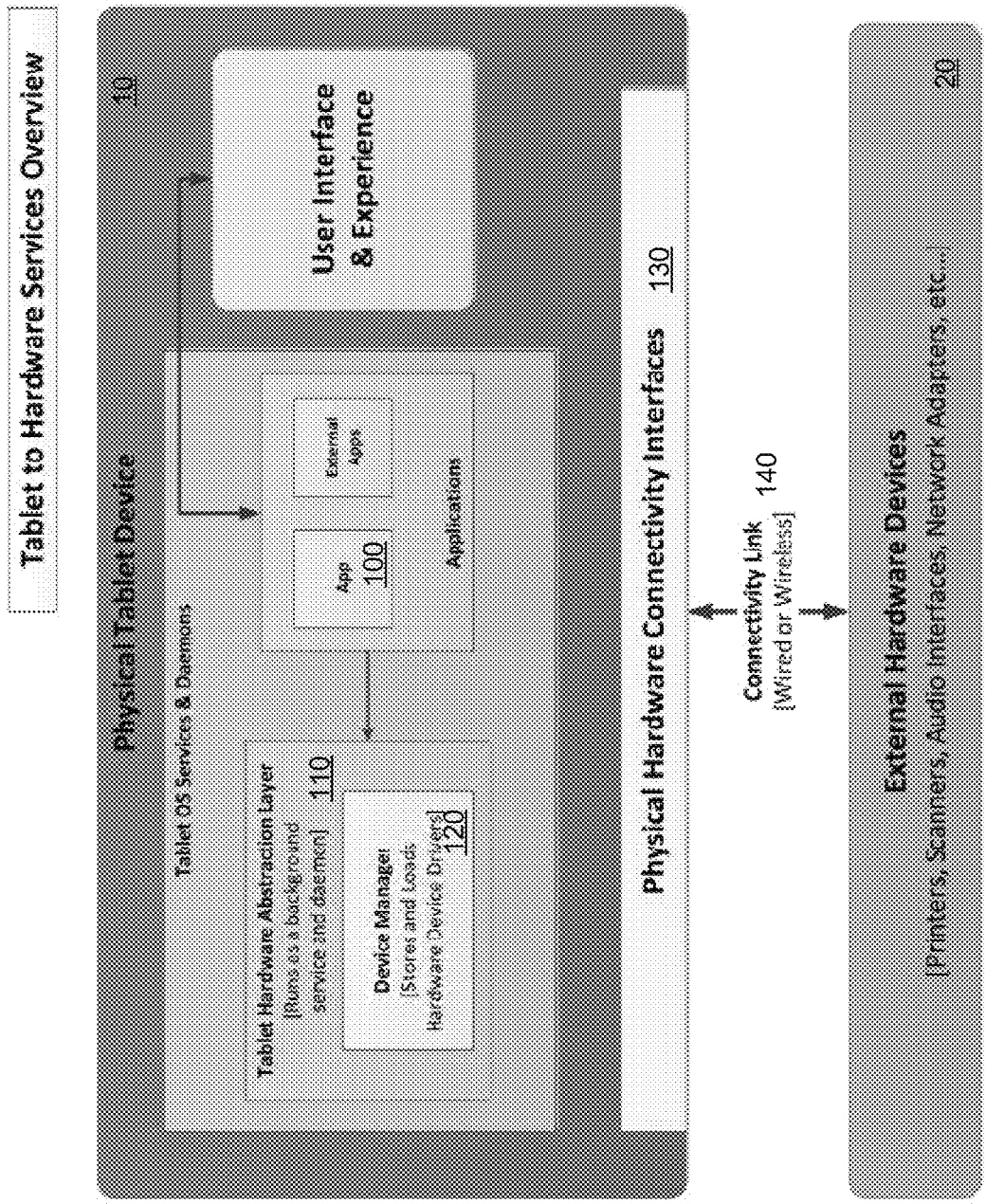
FIG. 1 shows a schematic diagram of a mobile device (tablet) connected with peripheral services for a system in accordance with an embodiment of the present invention.

Mobile (or remote) devices 10, including but not limited to devices such as tablets and smartphones, are currently unable to access non-networked physical peripheral devices 20, and can only access a limited set of networked devices. In various exemplary embodiments, the present invention solves this problem by providing a means for management and access to externally connected peripheral devices by mobile or remote devices. The invention takes user and/or application data on a mobile device 10 and sends it to externally connected peripheral devices 20. External peripheral devices includes, but are not limited to, printers, scanners, displays, audio interfaces, speakers, network adapters, storage drives, hard drives, and the like.

The present invention differs from what currently exists in the prior art. Currently, users of prior art systems have to have access to a physical computer (e.g., a computer server or personal computer) to access peripheral devices which are attached or connected to the physical computer. The present invention removes that restriction from users of mobile or remote devices (all references herein to "mobile devices" should be understood to apply to "remote devices" as well).

In one exemplary embodiment, as seen in FIGS. 1-5, the present invention comprises an end user mobile device application interface 100 installed as an application on a mobile device 10. The mobile device application may be coded to run on multiple mobile device platforms. The mobile device application makes calls to the mobile device's services and daemons 110 (daemons are computer programs that run as background processes rather than being under the direct control of an interactive user), which in turn access the mobile device manager 120 database or files for drivers for the externally connected peripheral devices 20. The driver for the selected peripheral then sends the desired data through the mobile device's physical hardware interface 130, across a connectivity link (wired or wireless) 140 to the peripheral device 20.

Figure 2:
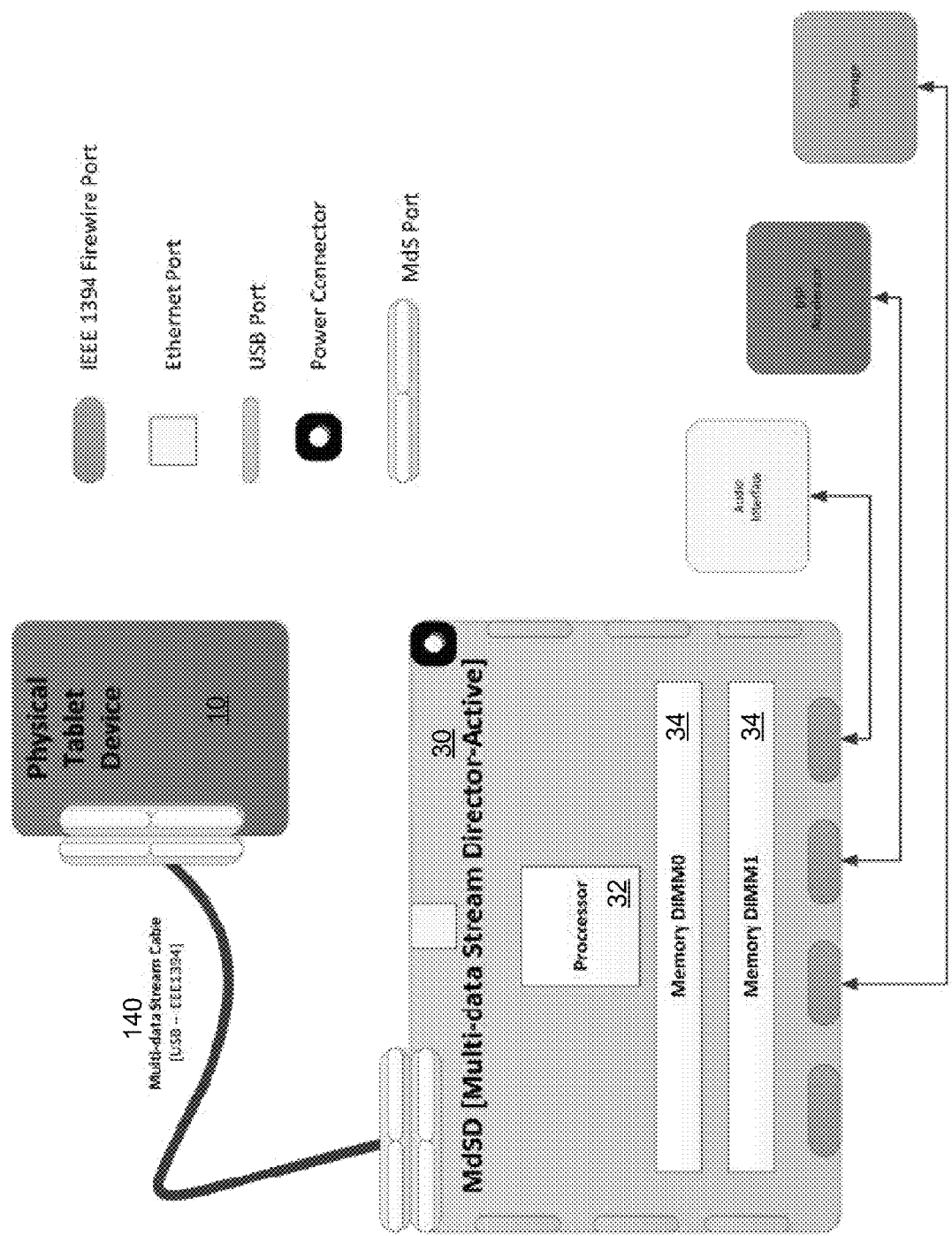
FIG. 2 shows another view of a system with a peripherals aggregation device in accordance with an embodiment of the present invention.
Figure 3:
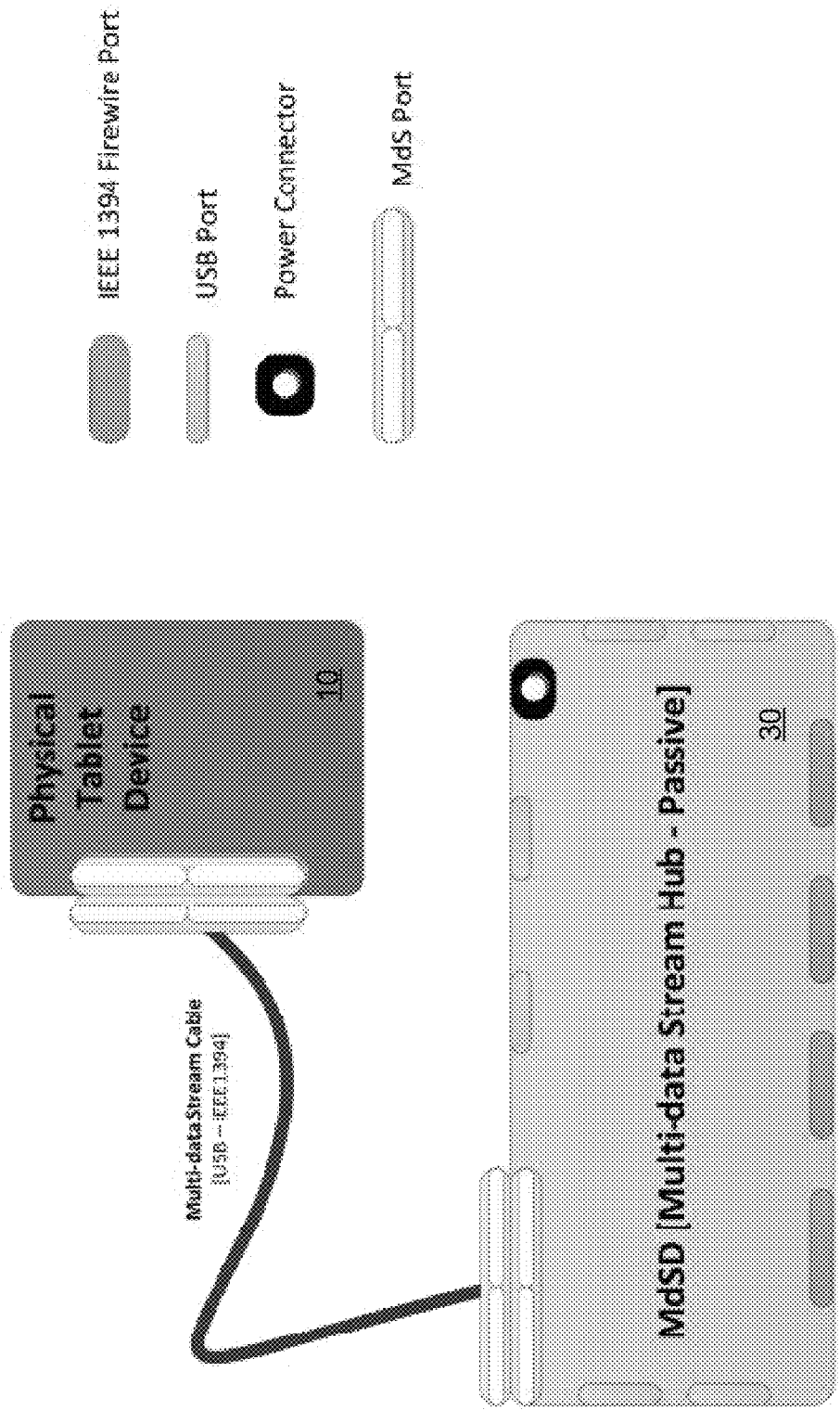
FIG. 3 shows another view of a system with a peripherals aggregation device.
Figure 4:
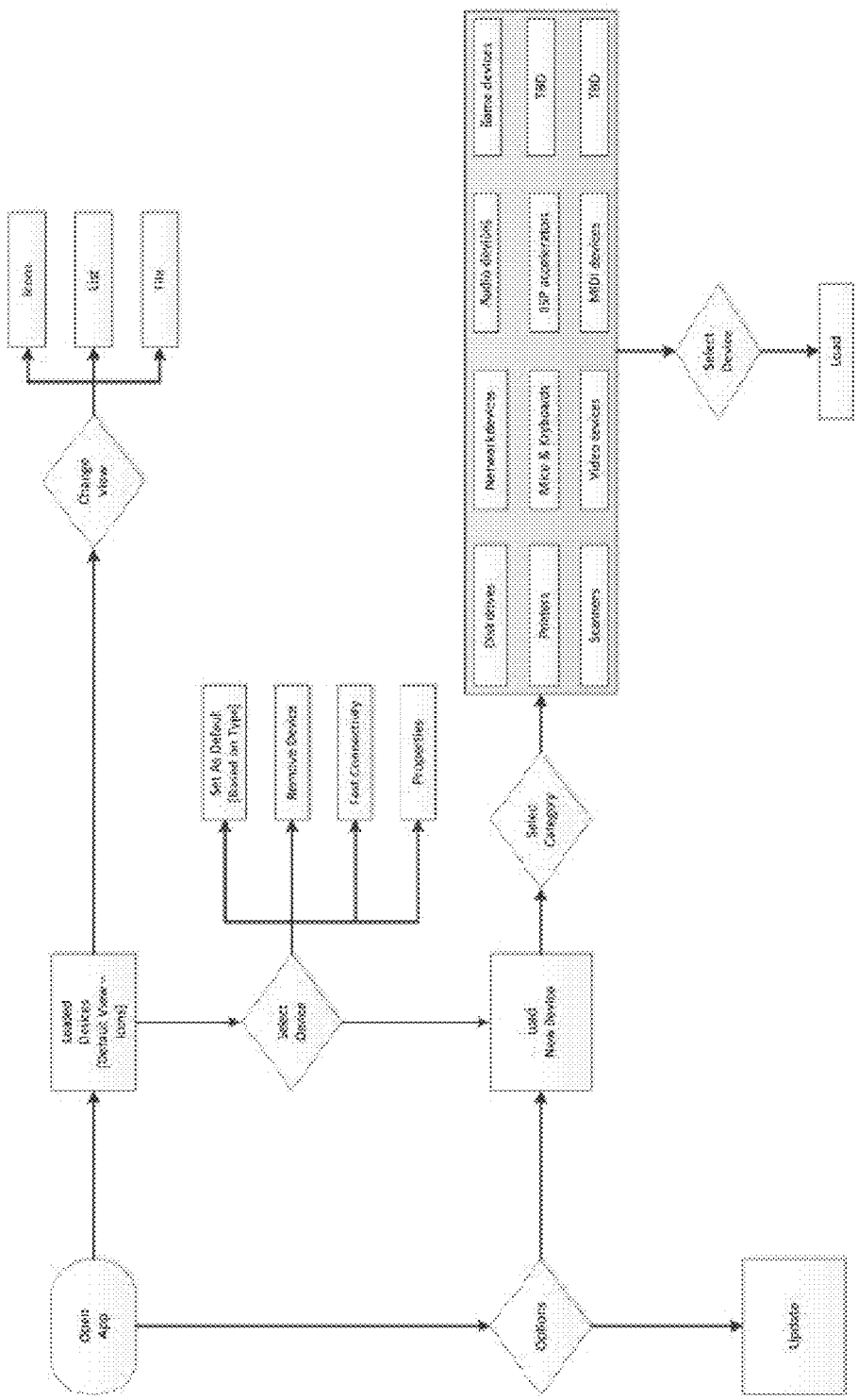
FIG. 4 shows a diagram of user interface workflow.
Figure 5:
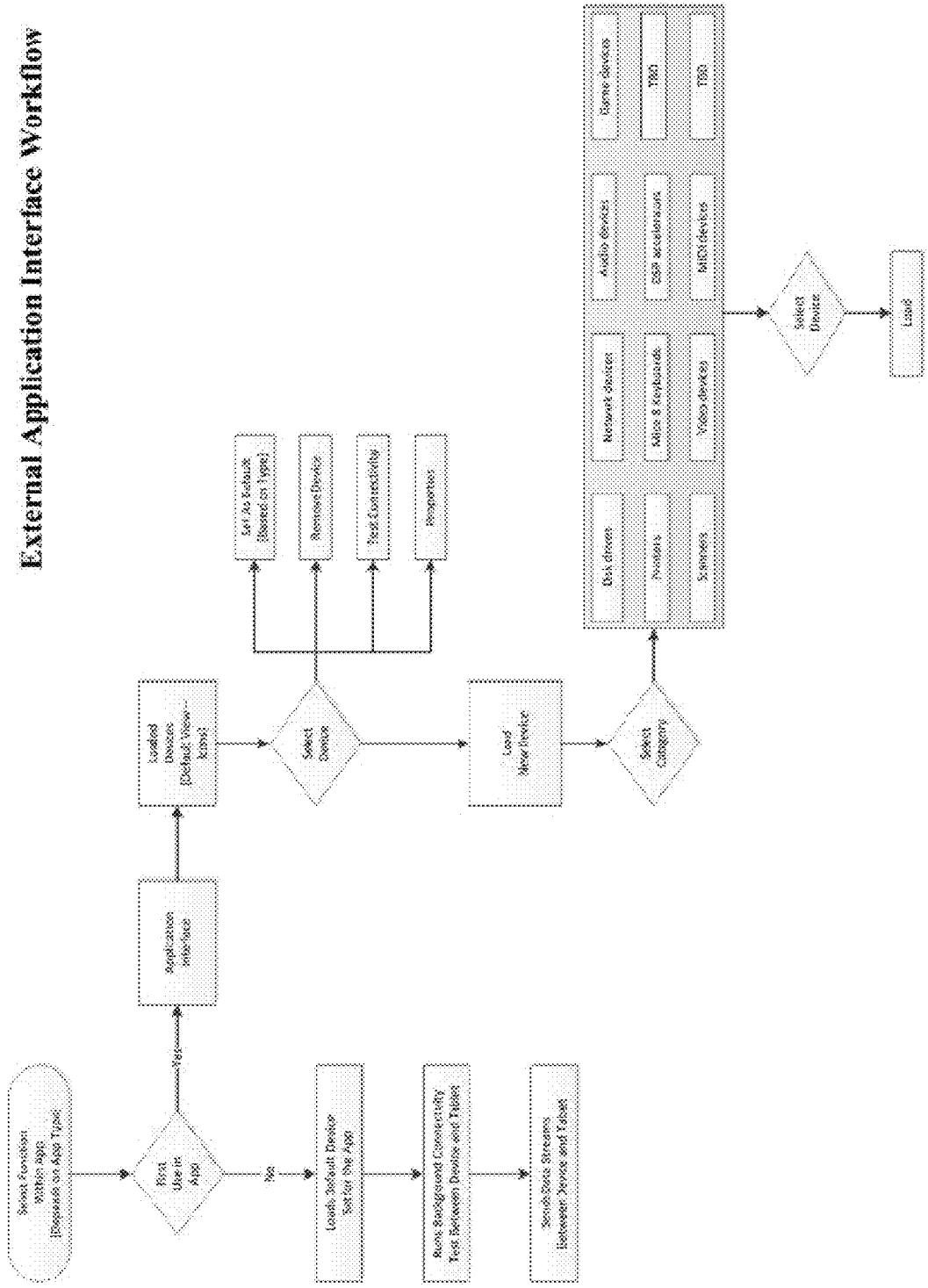
FIG. 5 shows an diagram of external application interface workflow.
Figure 6:
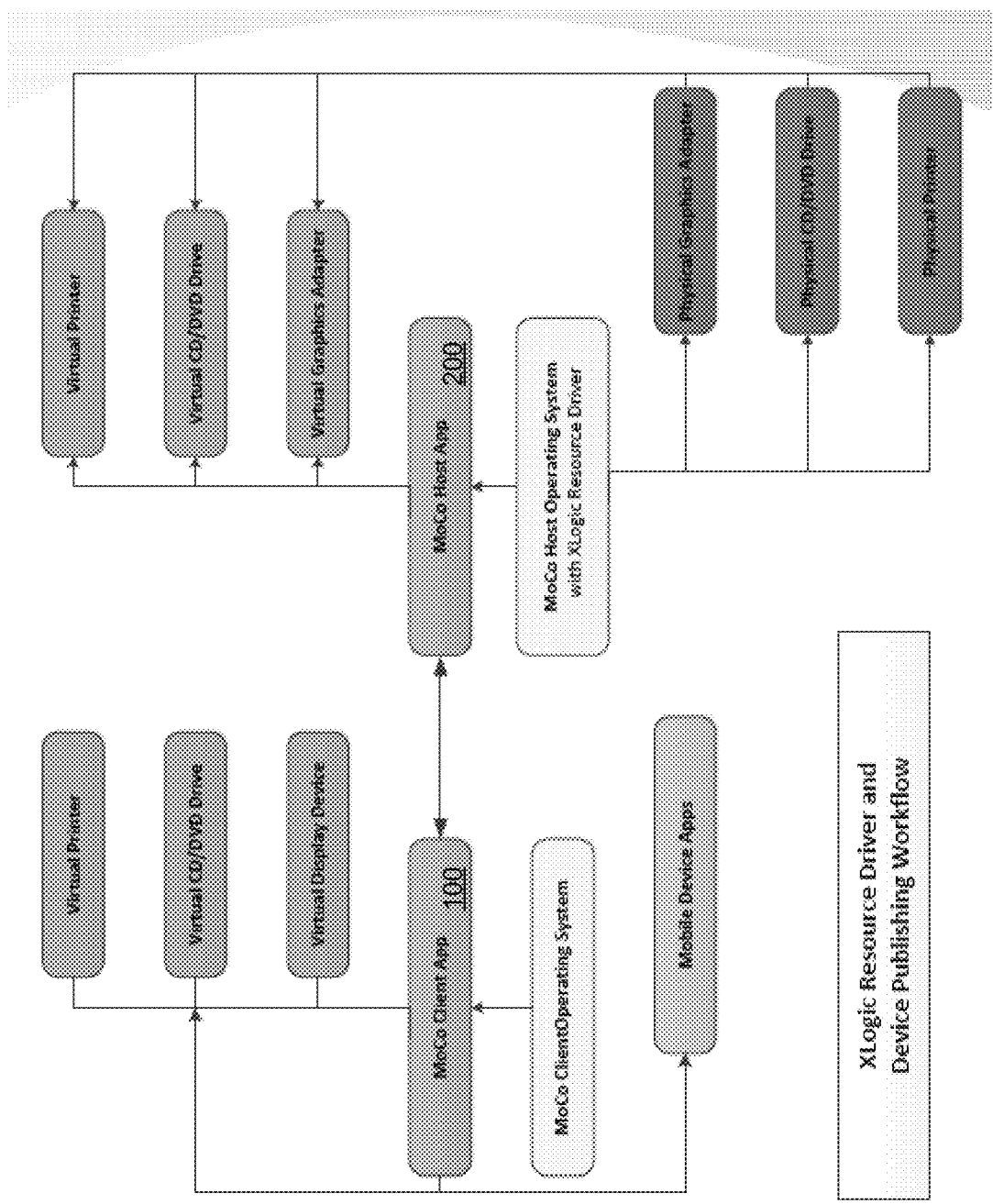
FIG. 6 shows a diagram of resource driver and device publishing workflow.
Figure 7:
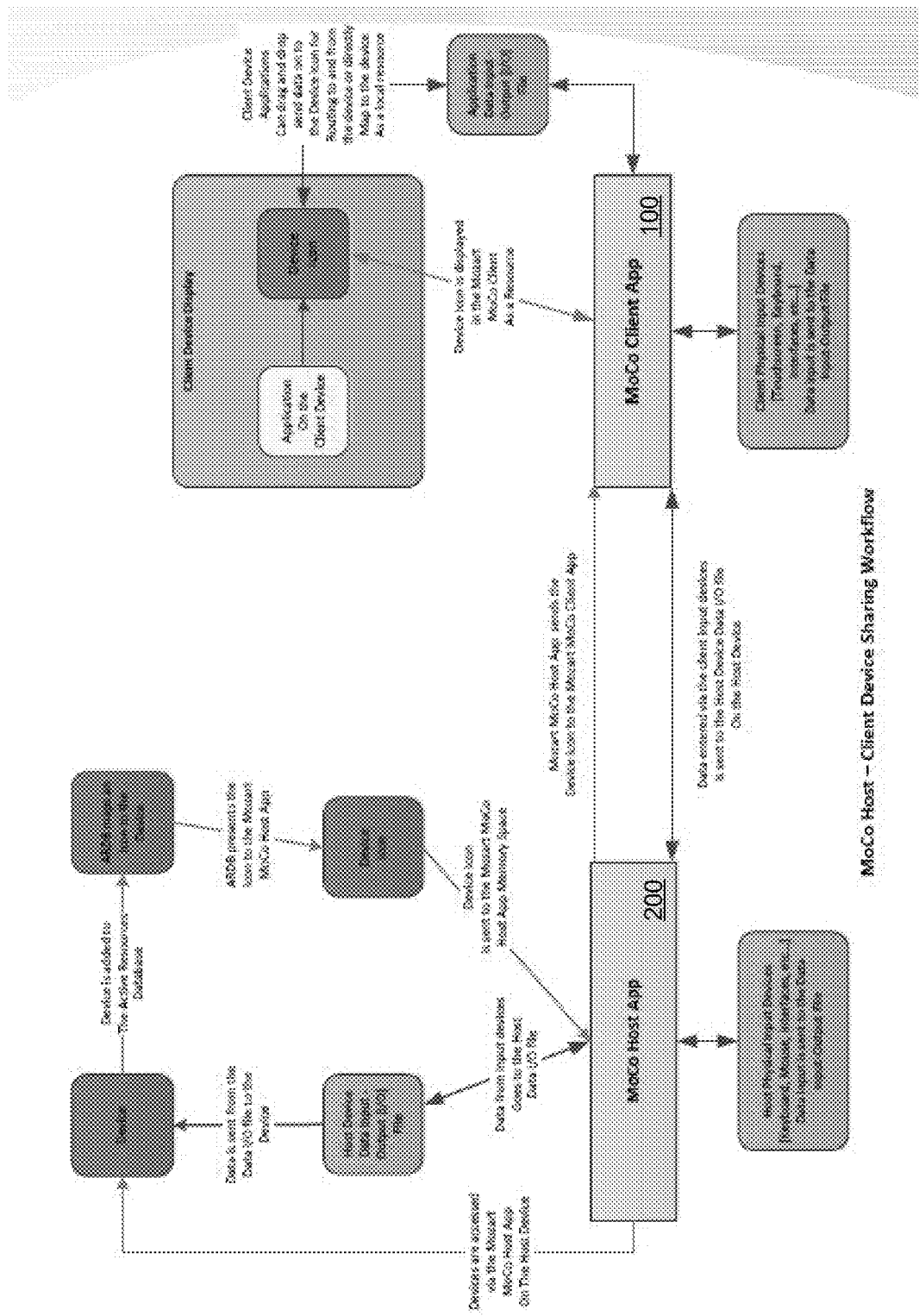
FIG. 7 shows a diagram of client device sharing workflow.
Figure 8:
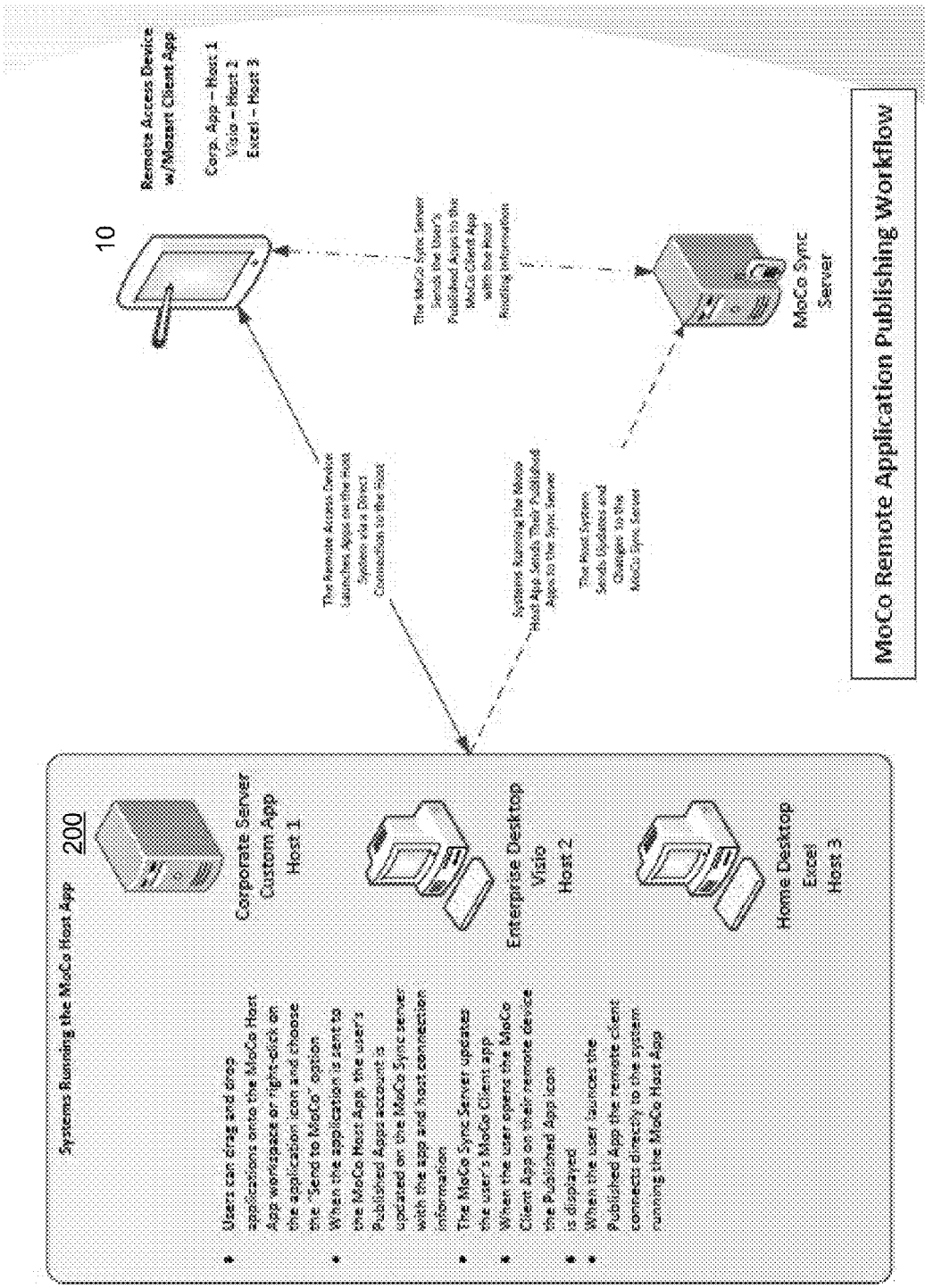
FIG. 8 shows a diagram of remote application publishing workflow.
Figure 9:
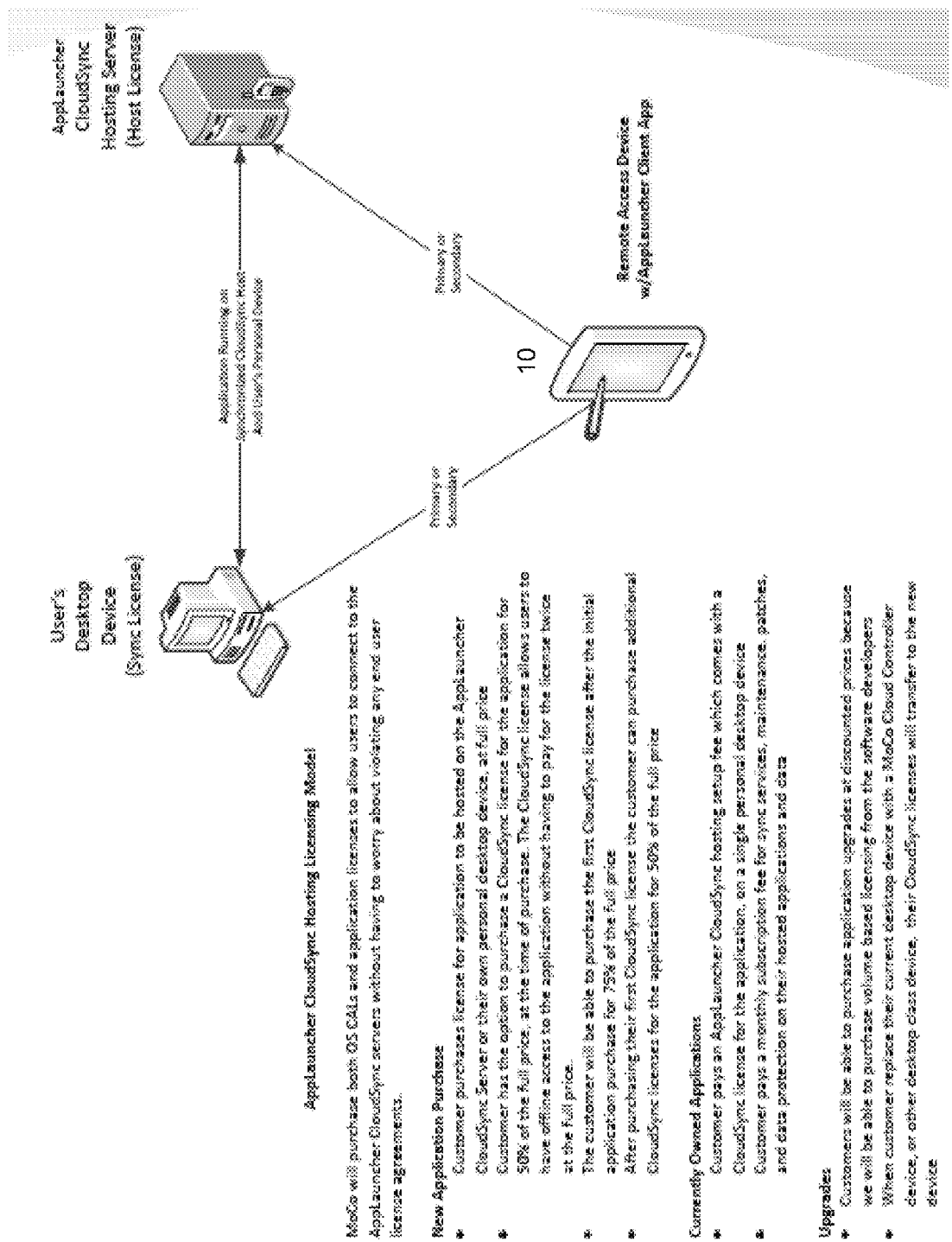
FIG. 9 shows a diagram of remote access device with cloudsync hosting licensing.
Figure 10:
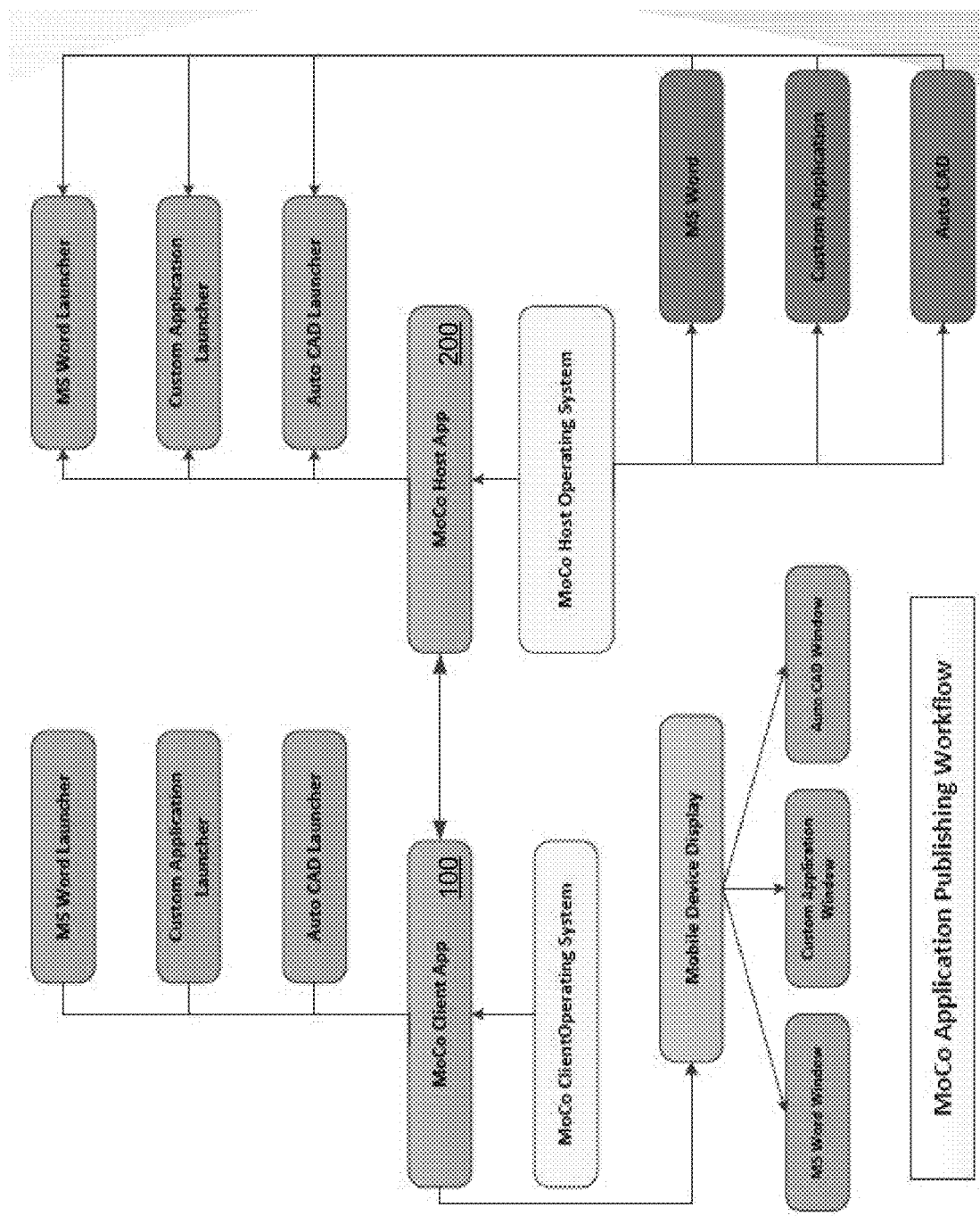
FIG. 10 shows a diagram of application publishing workflow.
Figure 11:
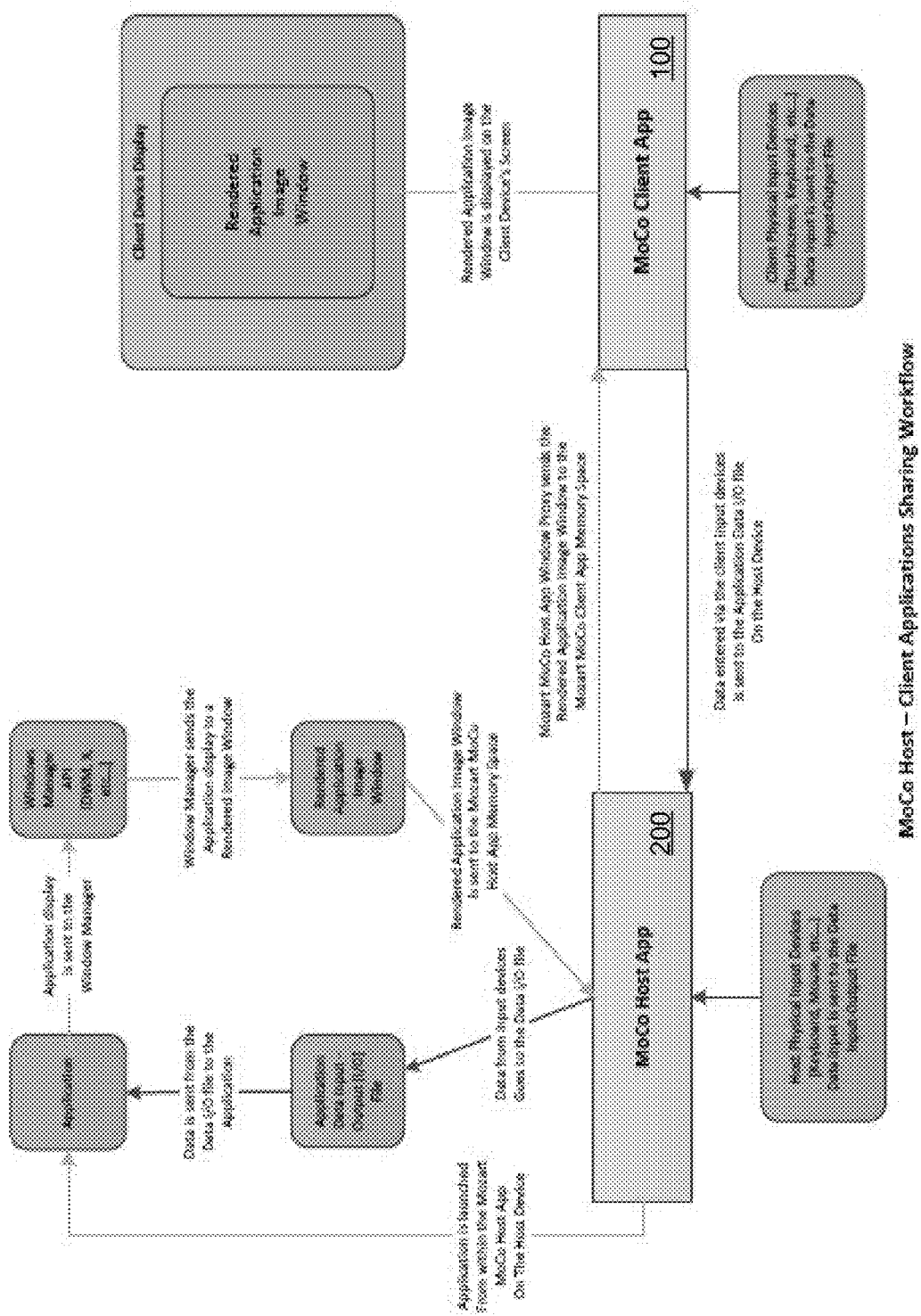
FIG. 11 shows a diagram of client applications sharing workflow.
Figure 12:
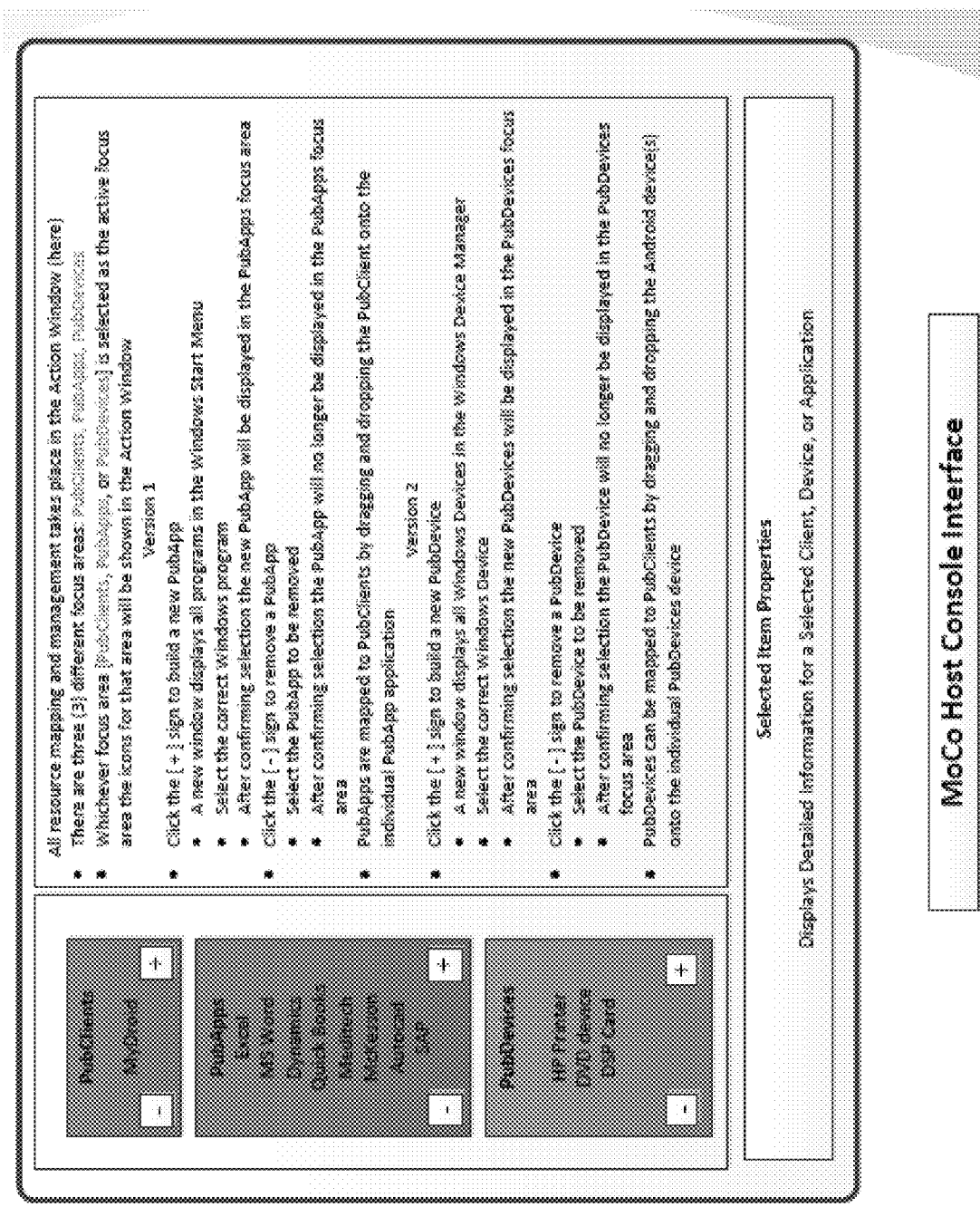
FIG. 12 shows an example of a host console interface design.
Figure 13:
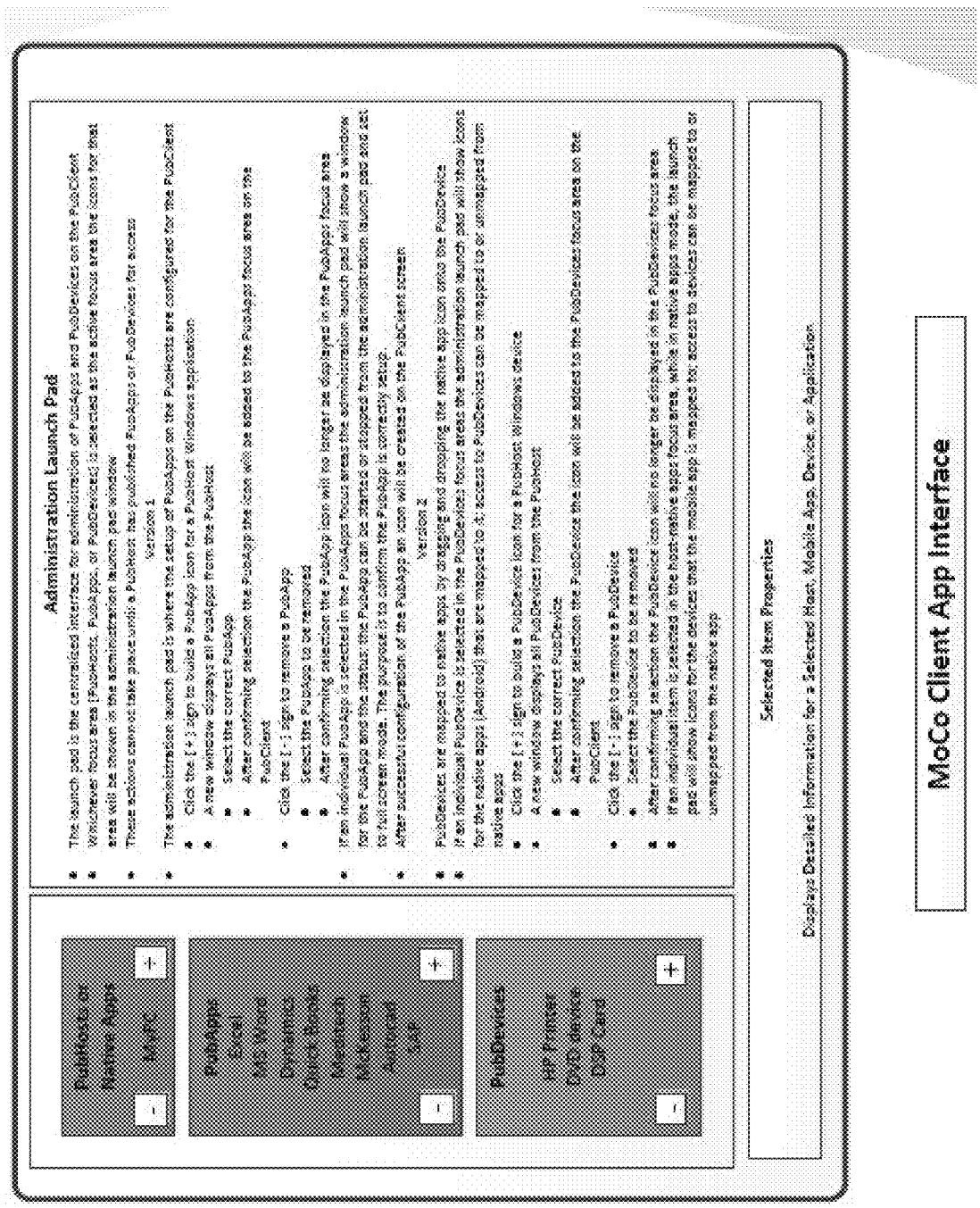
FIG. 13 shows an example of a client application interface design.
Figure 14:
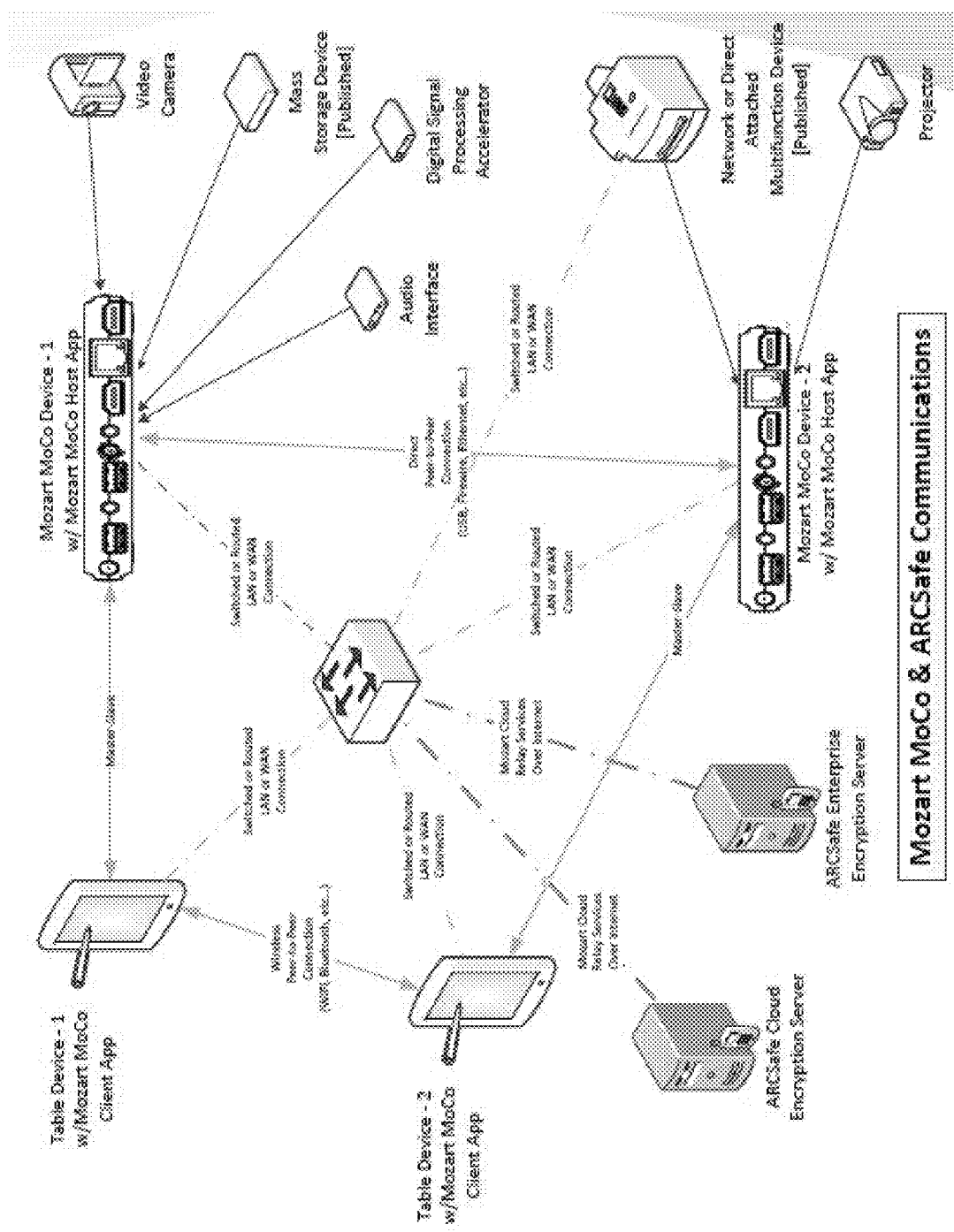
FIG. 14 shows a diagram of a system in accordance with another embodiment of the present invention.
Figure 15:
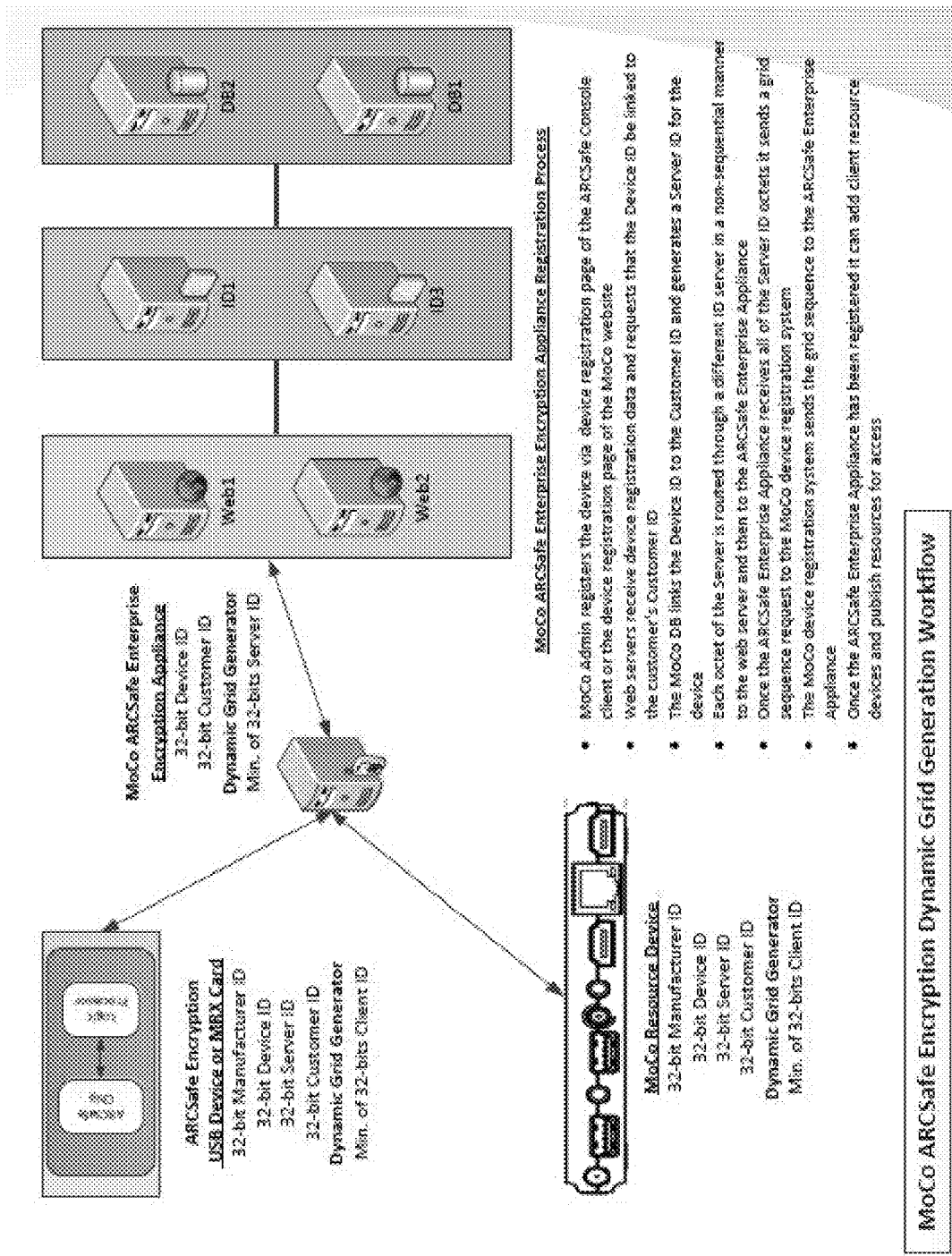
FIG. 15 shows a diagram of encryption dynamic grid generation workflow.
Figure 16:
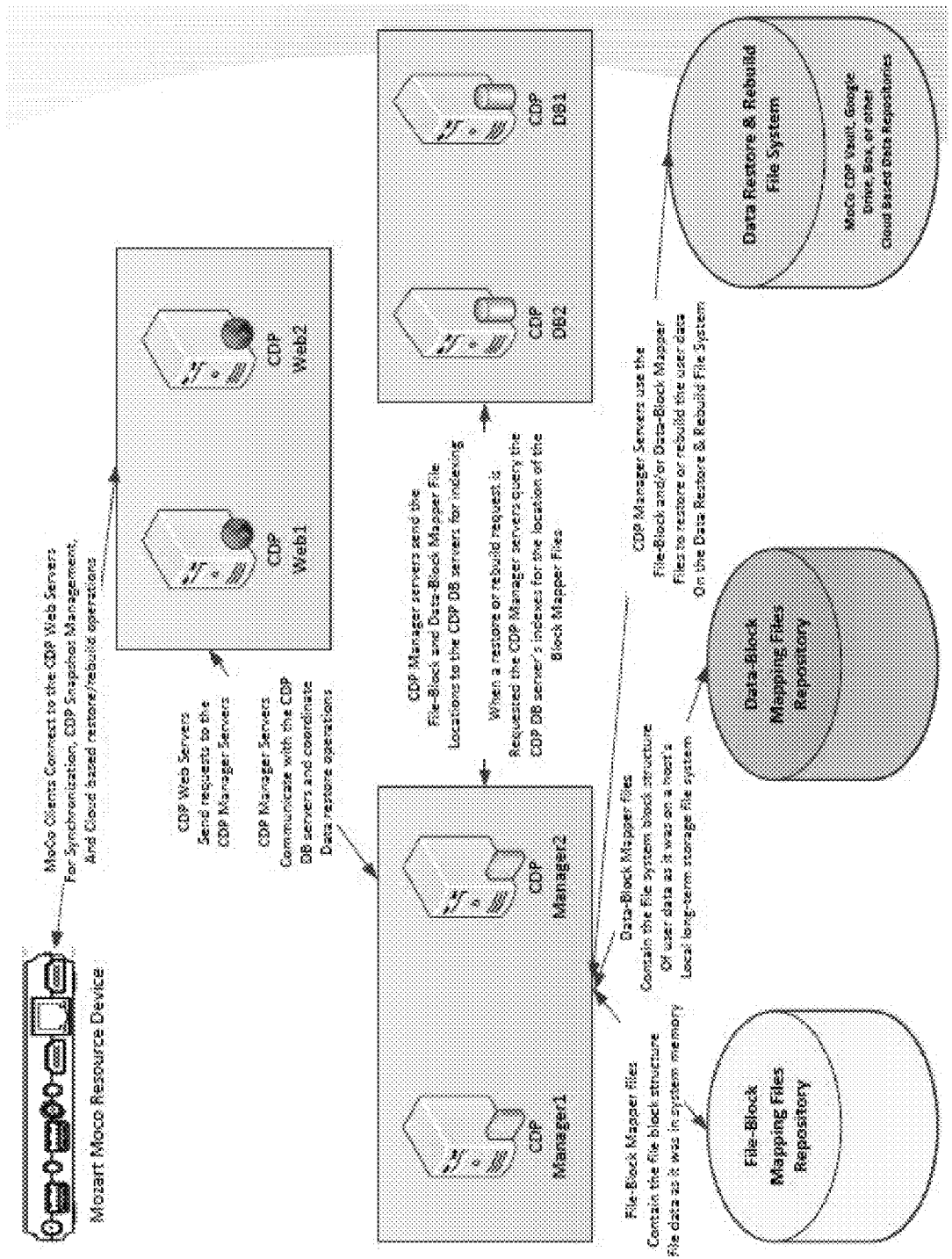
FIG. 16 shows a diagram of a file-block and data-block mapping files system.
Figure 17:
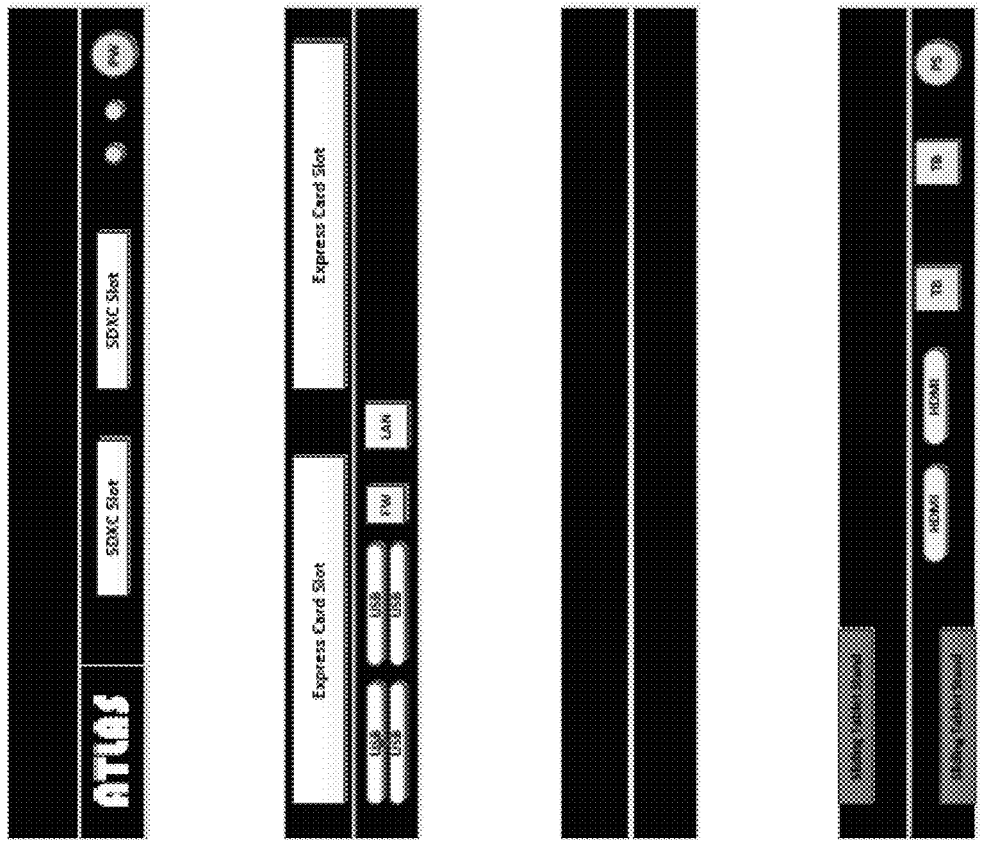
FIG. 17 shows a diagram of a central director device in accordance with another embodiment of the present invention.
Figure 18:
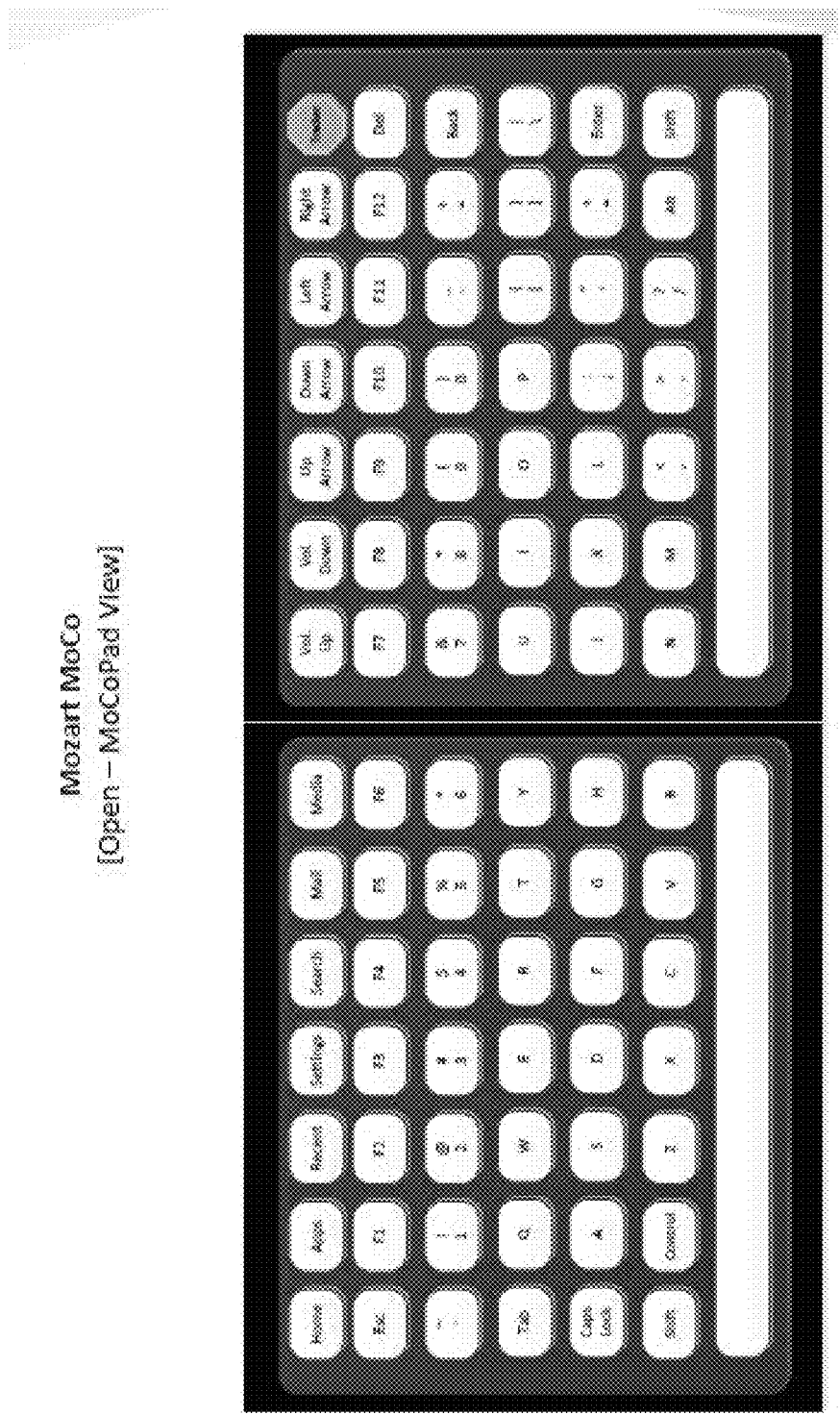
FIG. 18 shows a diagram of an exemplary keyboard/keypad layout.
Figure 19:
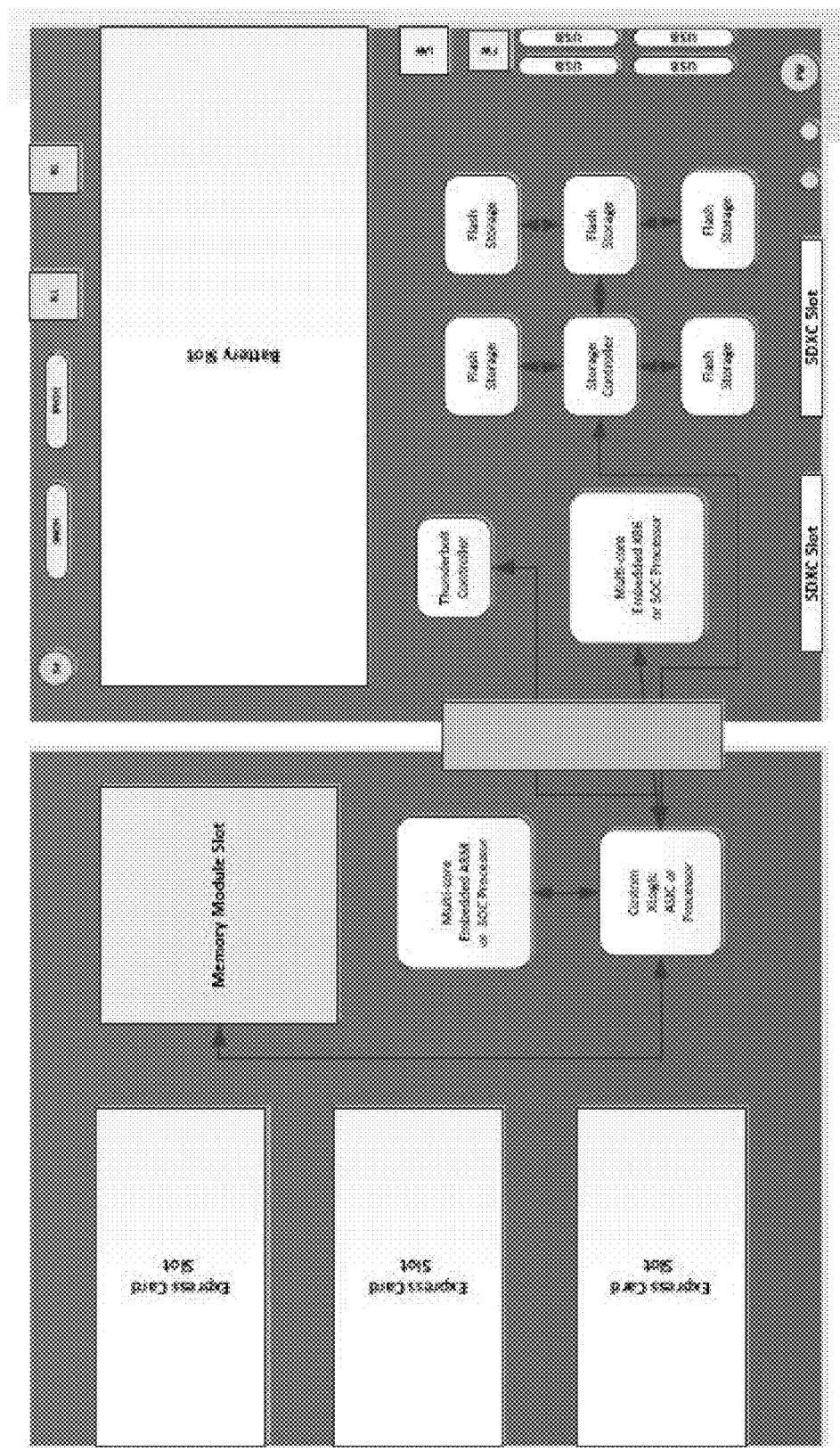
FIG. 19 shows a schematic diagram of the components of a central director device.
Figure 20:
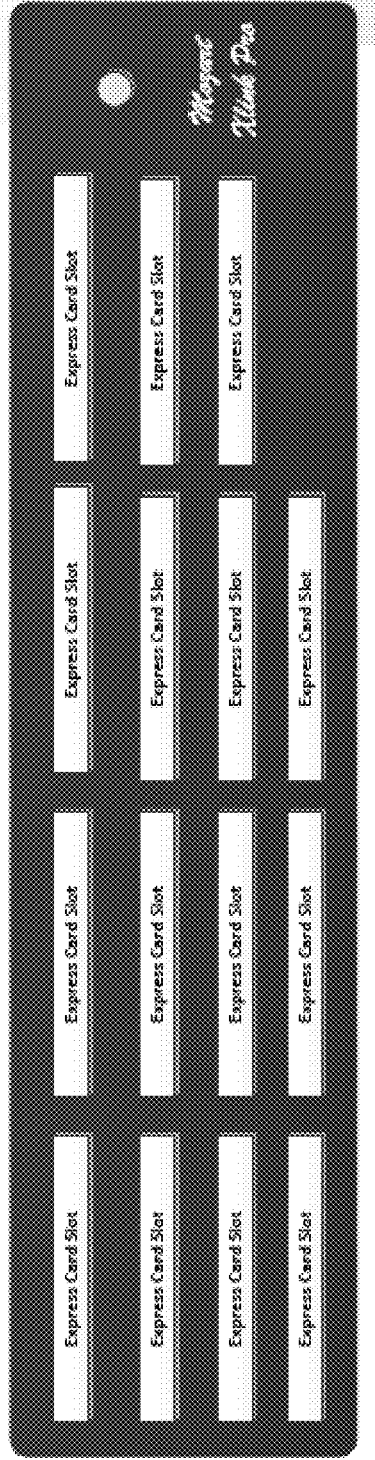
FIG. 20 shows an example of a rack for a computing system in accordance with another embodiment of the present invention.
Figure 20:
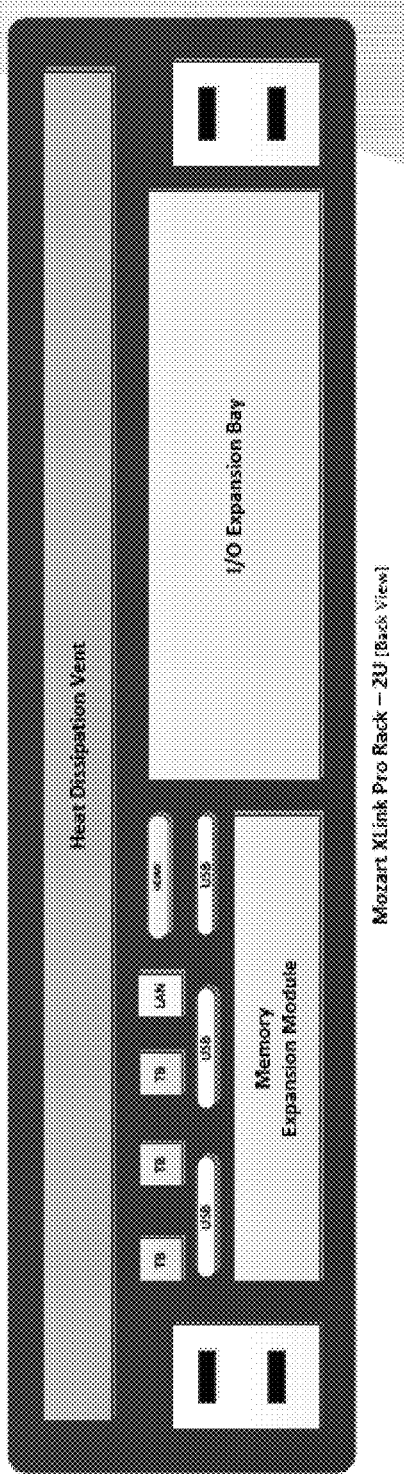
Figure 21:
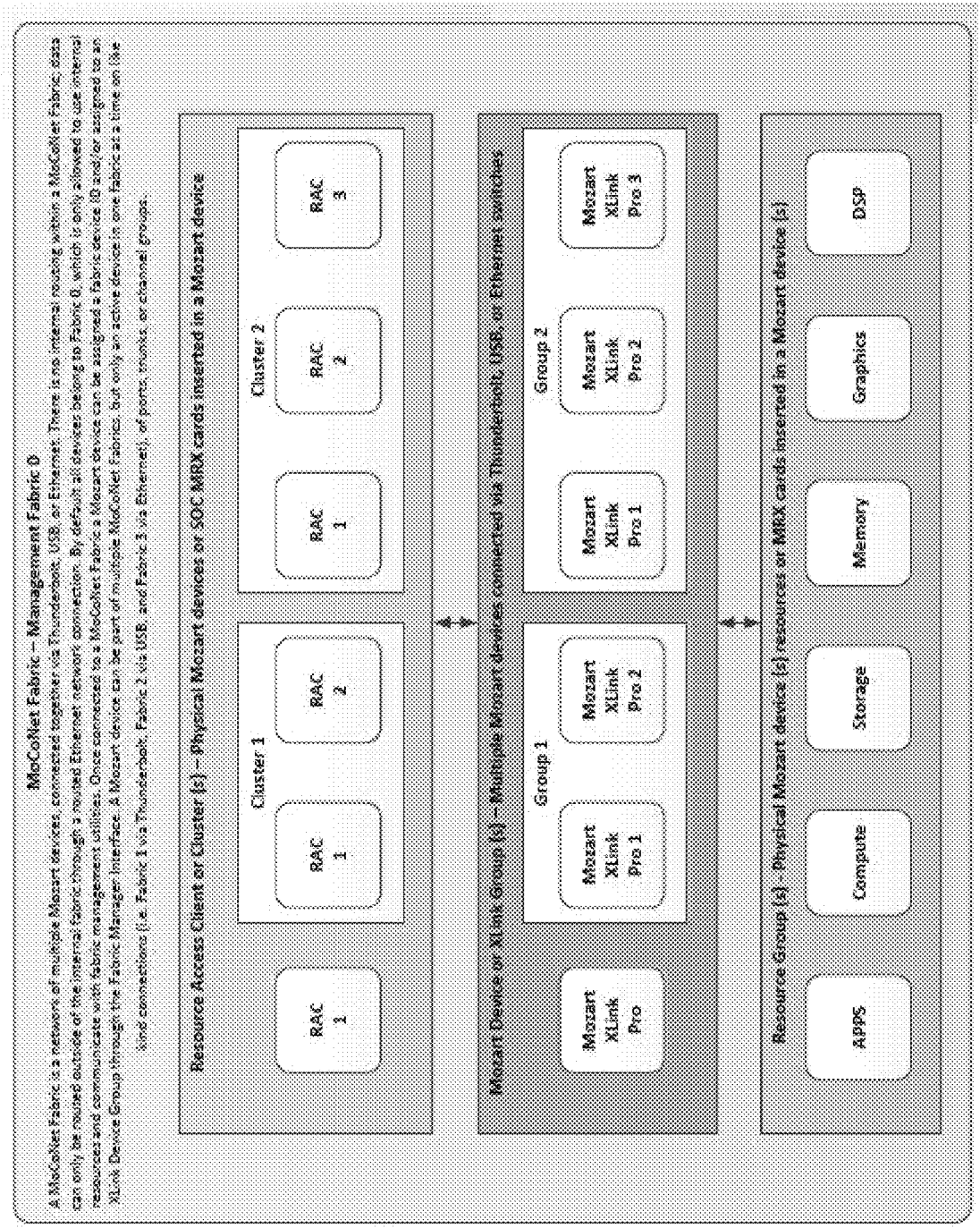
FIG. 21 shows an example of a network for a computing system in accordance with another embodiment of the present invention.
Figure 22:
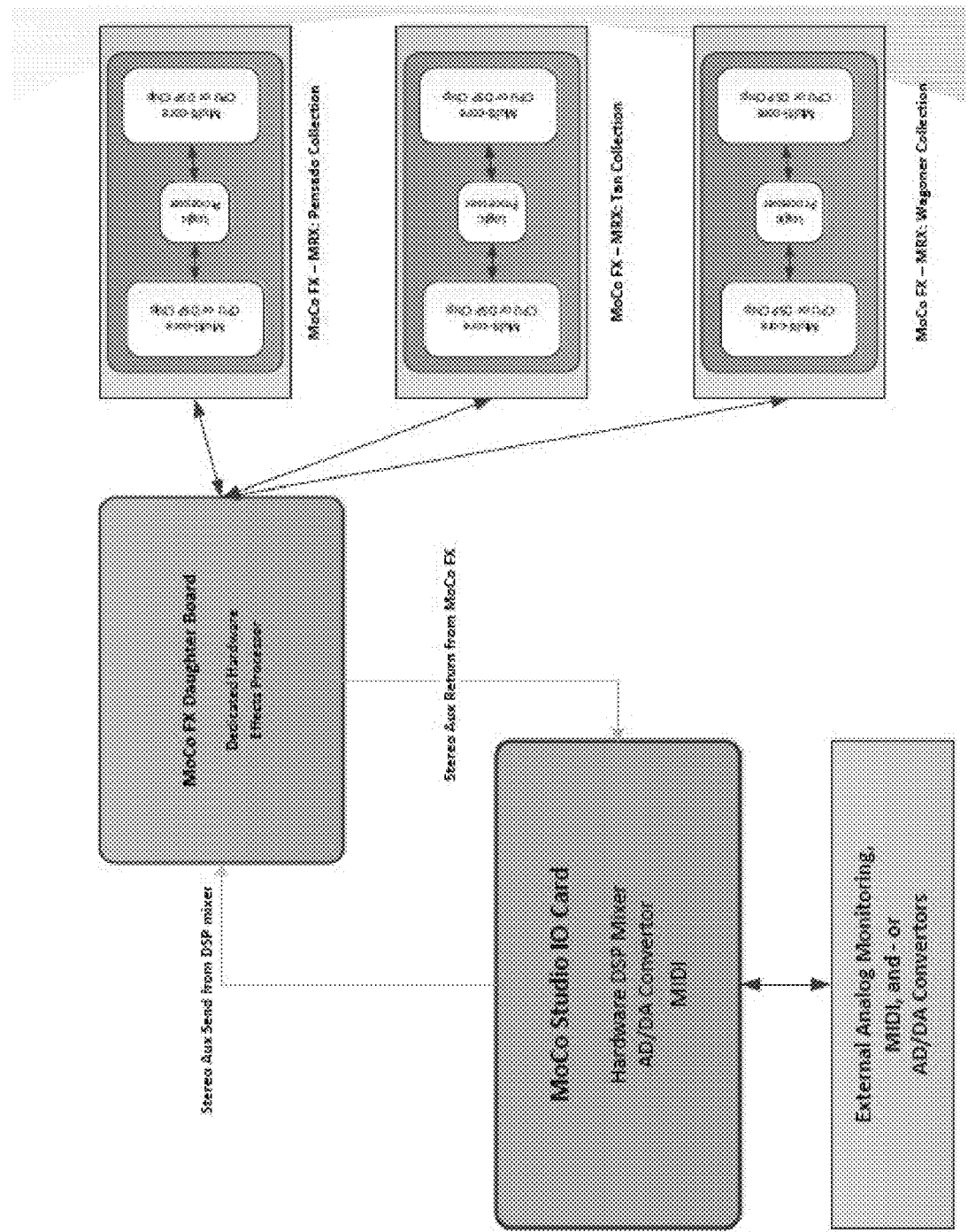
FIG. 22 shows a diagram of a computing system in accordance with another embodiment of the present invention.
Figure 23:
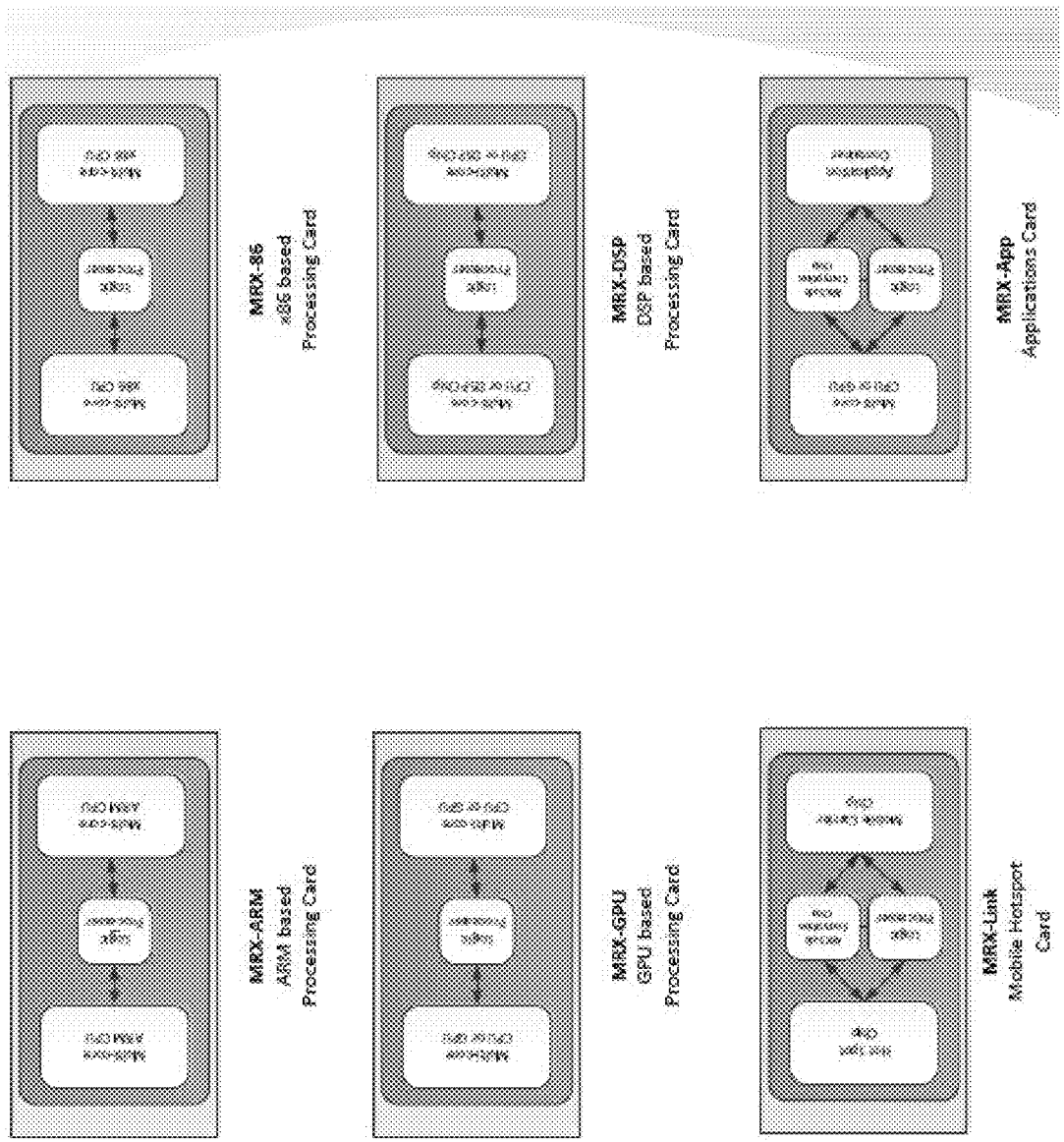
FIG. 23 shows a diagram of cards for a computing system in accordance with another embodiment of the present invention.
Figure 24:
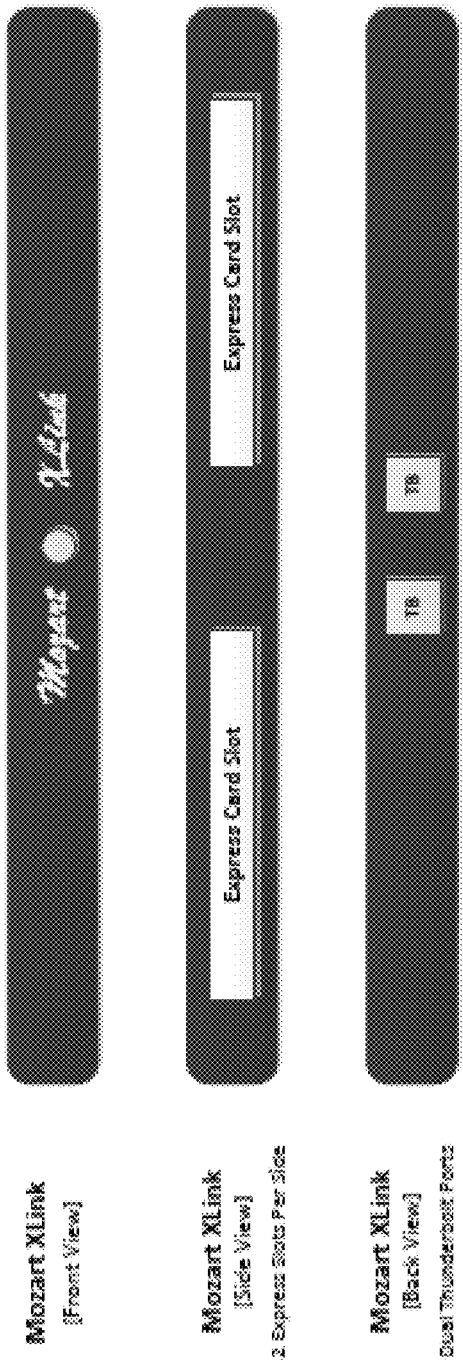
FIG. 24 shows a diagram of an XLink device for a computing system in accordance with another embodiment of the present invention.
Figure 25:
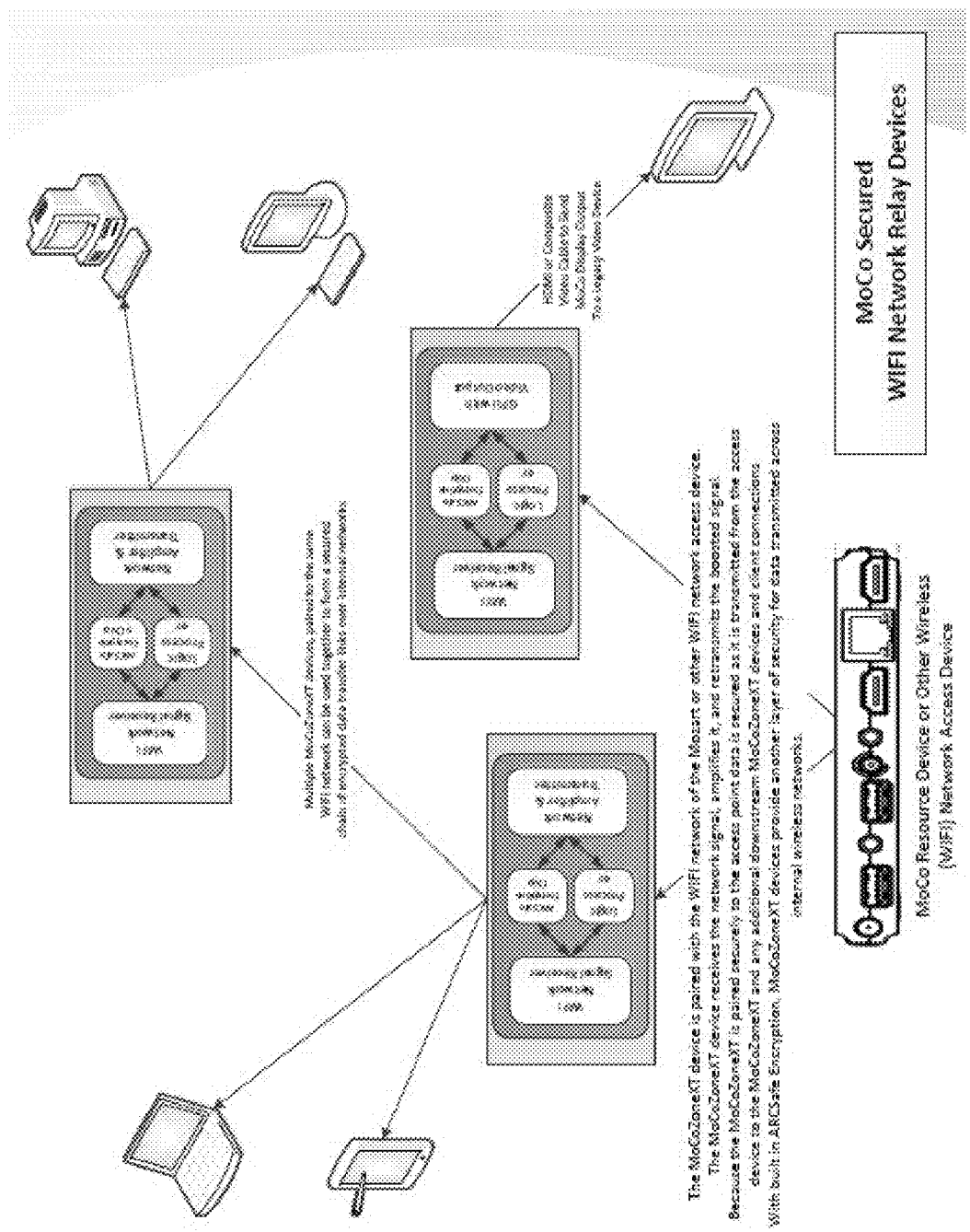
FIG. 25 shows a schematic diagram of a system of secured WiFi network relay devices for a computing system in accordance with another embodiment of the present invention.
Figure 26:
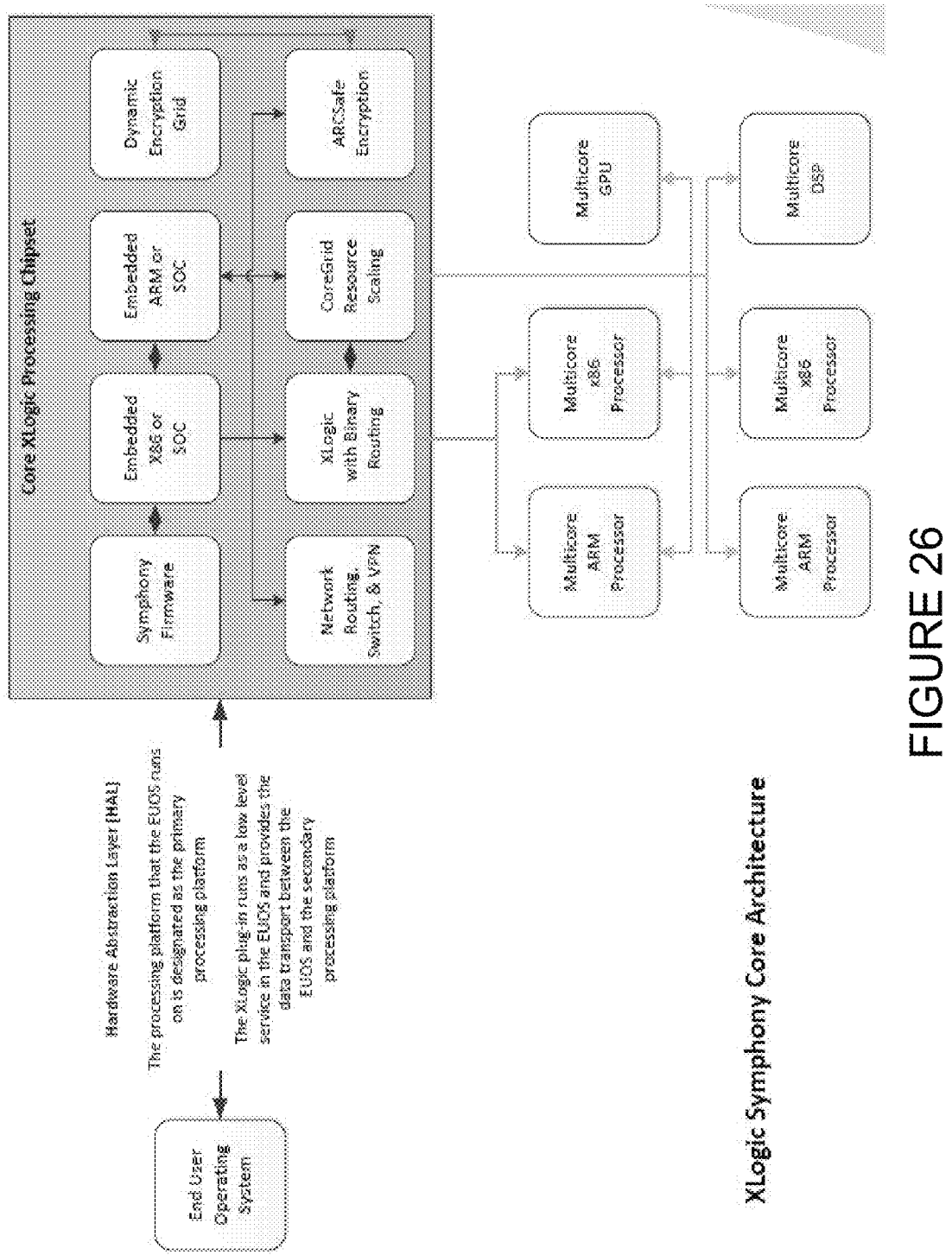
FIG. 26 shows a schematic diagram of a system architecture in accordance with an embodiment of the present invention.
Figure 27:
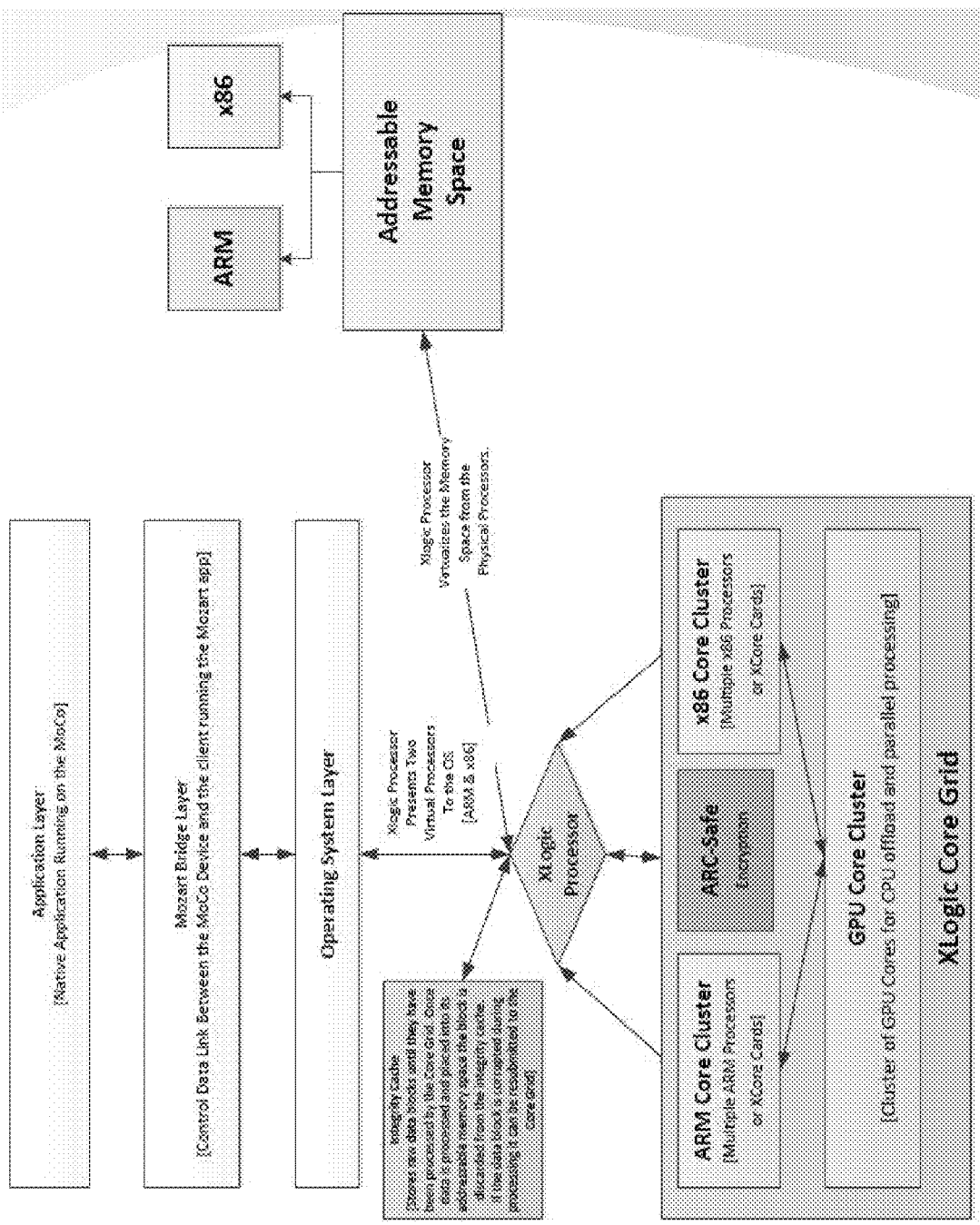
FIG. 27 shows a diagram of the layers and components of a system in accordance with an embodiment of the present invention.
Figure 28:
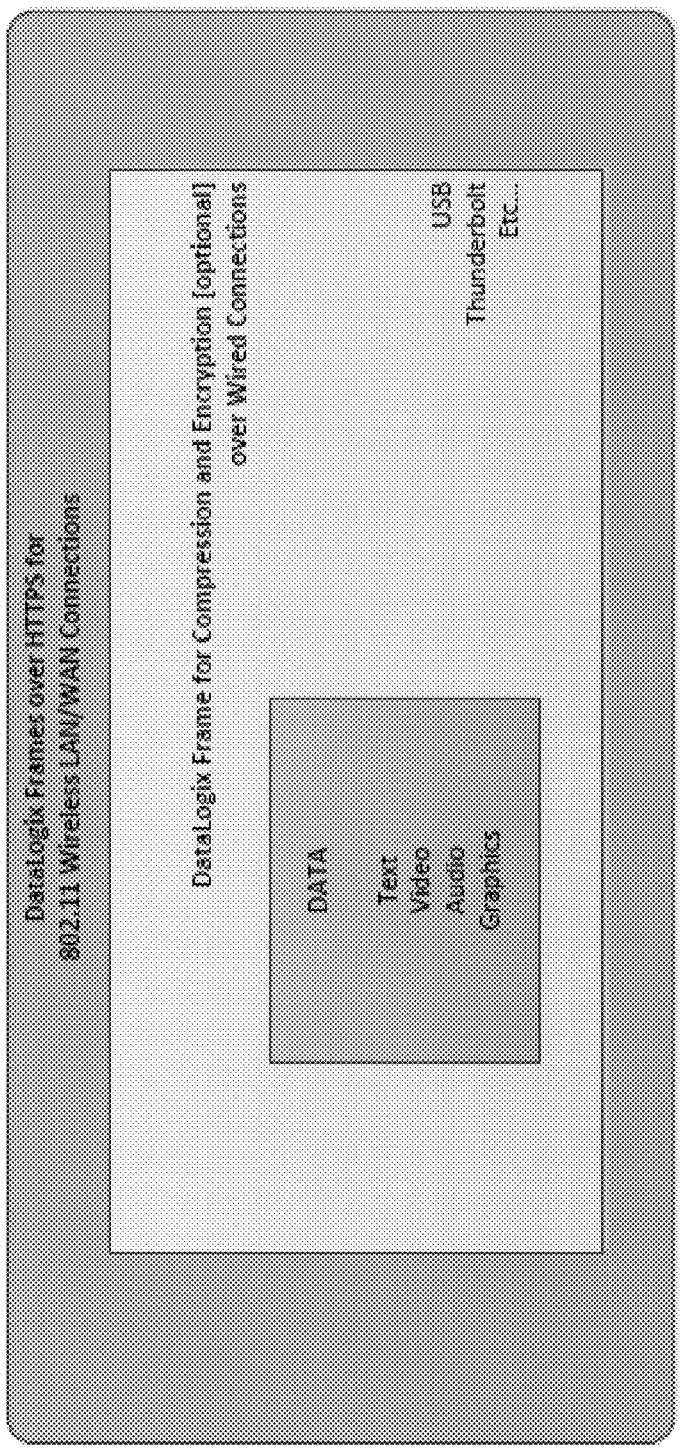
FIG. 28 shows a diagram of frames of wireless and wired connections in accordance with an embodiment of the present invention.
Figure 29:
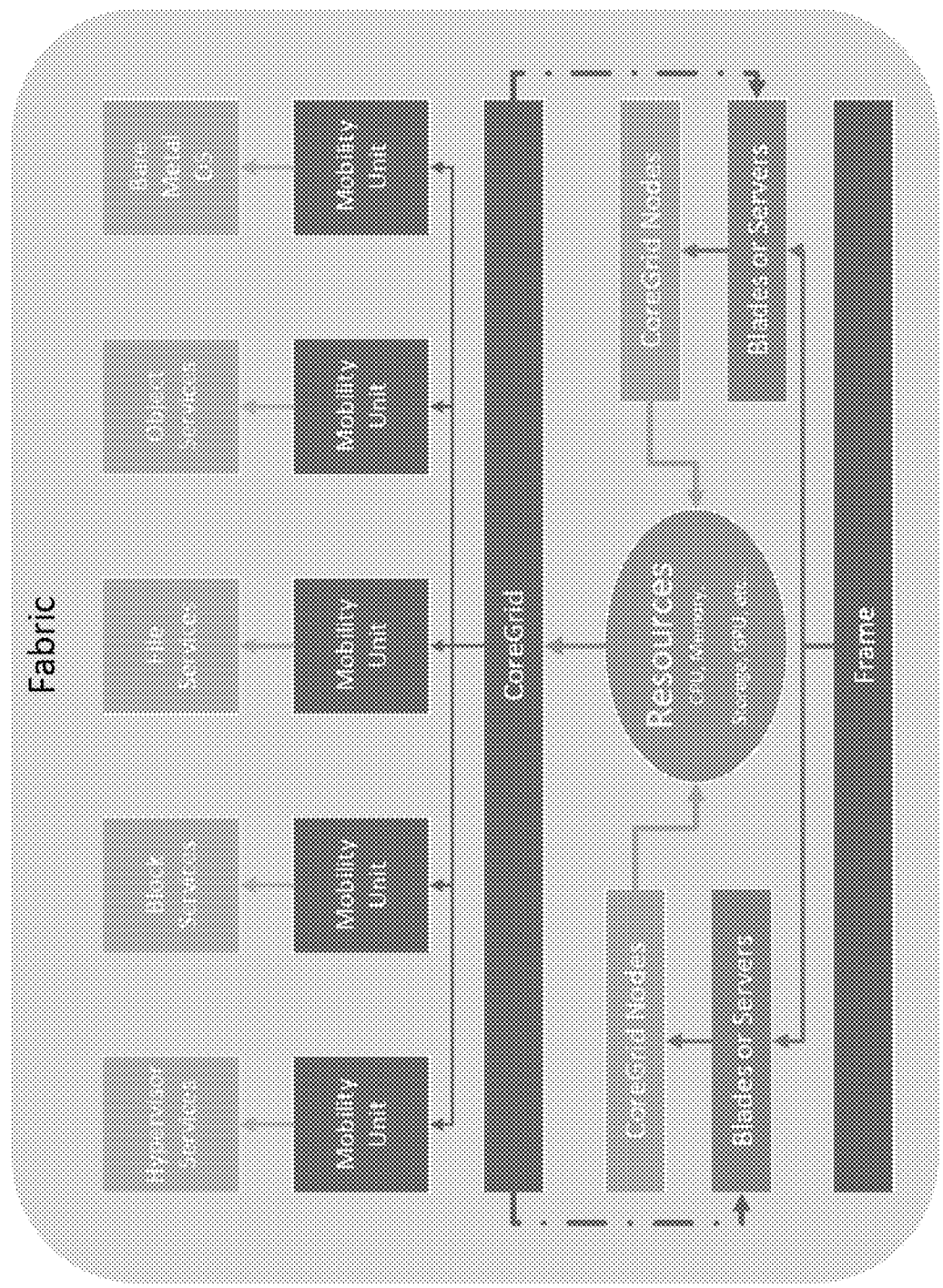
FIG. 29 shows an example of a single frame network fabric configured for CoreGrid services (which also may be referred to as Cloud Mobility Services).
Figure 30:
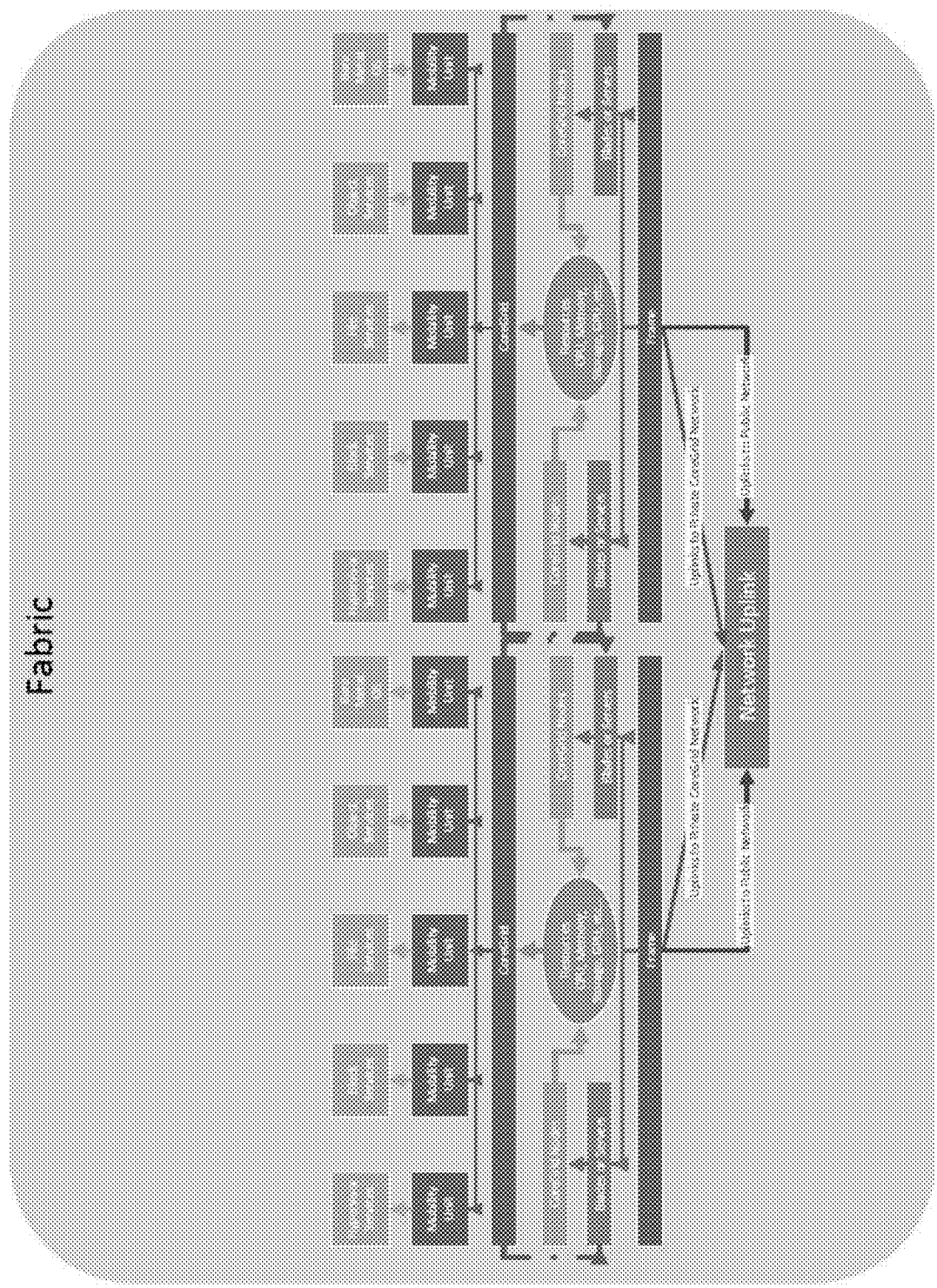
FIG. 30 shows an example of a multiple frame network fabric configured for CoreGrid services.

In an alternative embodiment, the data is sent across a connectivity link 140 to a peripherals aggregation device (which also may be referred to as a resources aggregation device) 30. The peripherals aggregation device may be active or passive, as seen in FIGS. 2 and 3. If active, the peripherals aggregation device's operating system and management application processes the data internally (i.e., through its processor or processors 32 and memory 34), and then sends the processed data through the necessary interface (e.g., USB, IEEE1394, Ethernet, and the like) and to the selected peripheral device 20. In another embodiment, the peripherals aggregation device's 30 operating system, management application(s), and interfaces also provide a mechanism for data to be exchanged between the connected devices 20 without having to be processed on the host mobile device's 10 hardware components.

In addition to sending user and/or application data from a mobile device to an external peripheral devices, the application also allows a user's applications to access externally connected peripheral devices and retrieve data from them. There are multiple if-then relationships and subroutines based upon the user and/or application requirements and the peripheral devices capabilities.

As part of the mobile device application, the devices management services and/or daemons 110 support multiple peripheral devices and allows for plug-and-play operations for the end users. In one embodiment, the mobile device application is a single management interface to peripherals for users and applications. The mobile device may be equipped with the manufacturer's hardware interface or, alternatively, a proprietary Multi-data Stream (MdS) interface in accordance with an embodiment of the present invention.

Either an open system cable (e.g., USB, or the like) or a Multi-data Stream cable may be used for connectivity 140 between the mobile device 10 and peripheral devices 20 or a peripherals aggregation device 30. The peripherals aggregation device 30 provides for connectivity of multiple peripheral devices to the mobile device, and may be active or passive, as described above. The peripherals aggregation device may be built using commodity computer components, such as processors, memory, interfaces (e.g., USB, IEEE1394, Ethernet, and the like), or other internal components as required to perform its functions. A custom operating system and management applications allow the peripherals aggregation device to provide advanced features and functionally to the mobile devices for attached peripherals.

In another exemplary embodiment, as shown in FIGS. 6-16, in addition to permitting a user to use mobile device software and/or its hardware components to access and utilize peripheral devices to perform various functions, the present invention also may be used to provide a mobile user access to a computer-based or network-based services and options (currently described as "cloud" or "online" services). The invention may be used in conjunction with mobile device interfaces, connectivity cables, peripheral aggregation directors and/or switches, and peripheral aggregation hubs. A client application 100 resides on the mobile device, while a host application 200 resides on the external device (e.g., personal computer, computer server, network computer, or a peripherals aggregation device as described above). In one embodiment, the client application or device must be authenticated by the host device, or a separate licensing or sync device. Authentication may be encrypted.

In yet another embodiment, as seen in FIGS. 17-30, the invention comprises an advanced heterogeneous modular computing system. The system is a combination of tightly integrated computer hardware and software, working together to provide an efficient, powerful, and scalable mobile computing environment. It provides users of mobile computing devices a platform that will allow them to work more efficiently and effectively, without sacrificing the power and advanced features that currently require desktop and workstation class systems. In one exemplary embodiment, an advanced heterogeneous modular computing system includes, but is not limited to, the following components: integrated keyboard; integrated mouse control device; processors (e.g., primary, secondary, control); memory; storage; graphics adapter; network connectors; data interconnects; expansion slots and cards; expansion devices (not exclusively restricted to a particular size, format, or configuration); and power sources. The system provides a unified workspace across heterogeneous platforms; allows the sharing of applications across devices on heterogeneous platforms; and provides the following services and processes: device and peripheral consolidation and sharing; physical data input and mouse control; data synchronization; data optimization and protection; data transport and security; multi-device connectivity; dynamic resource scaling; binary data routing; memory management; mobile device offloading; network access, switching, and routing; application publishing; device publishing; binary routing; data service profiling; CoreGrid resource manager; dynamic data input/output; inter-system data transport; DataLogix encapsulation; client device connections manager; dynamic encryption grid and key manager; file/data block mapping; data protection and optimization manager; network fabric manager; and wireless network transport relay.

When assembled in an end user configuration, an advanced heterogeneous modular computing system serves as a Mobile Cloud Controller ($MC^2$) device for users of mobile and remote computing services and resources. The $MC^2$ comprises multiple heterogeneous computing platforms interconnected within a singular physical device (referred to herein as the "Director" device), controlled by a $MC^2$ processing unit, such as the dedicated XLogic $MC^2$ processing unit. The processing unit is the centralized resource manager for internal components and external peripherals connected to the $MC^2$ Device. The processing unit creates and interacts with the Dynamic Data I/O (DDIO) files for physical components and peripherals. DDIO files are presented to the internal computing platforms as the components and peripherals they represent.

In one particular embodiment, the $MC^2$ resource manager provides the virtual memory and storage management system that allocates memory and storage resources to the internal computing systems. The $MC^2$ processing unit provides the interfacing to the XLogic CoreGrid for resource scaling. The resource manager monitors the resource utilization statistics for the internal systems and dynamically allocates or removes resources as required. Resources within a CoreGrid implementation may be allocated to access devices or systems based upon assigned or dynamic profiles, priorities, or tiers. Because resources are provisioned to internal systems through DDIO files, data is protected from corruption via data integrity caching as it is transferred between the internal systems and the physical components or peripherals. By dynamically adding and removing resources from the internal systems, the $MC^2$ processing unit allows the $MC^2$ device to run more efficiently. Physical resources are powered on or off based upon whether their associated DDIO files are in a 0 or 1 state, 0 for off and 1 for on. The $MC^2$ processing unit also works with an encryption system, such as the ARCSafe Encryption system, to generate dynamic encryption grids and keys for data security. The $MC^2$ device's built-in networking system interfaces with the $MC^2$ processing unit to provide routing, switching, and fabric services. Binary routing is accomplished through the implementation of data service profiling for processing tasks and data types.

To facilitate transport agnostic transfers of data between the $MC^2$ device and external systems, the data is encapsulated in DataLogix frames (or the like) for encryption, compression, sequencing, and other data transfer operations. The $MC^2$ device uses ARCSafe Encryption, or the like, to securely transfer data to and from ARCSafe enabled remote systems. To provide for the most efficient utilization of memory and storage resources the $MC^2$ processing unit implements a data optimization technique that uses a file and block data mapping system to remove duplicate blocks of redundant data in both short term memory and long term storage. The $MC^2$ processing unit subsequently creates file system snapshots based off of the file and data block mapping files, which can be used for data protection and restoration. Snapshots along with the relevant block mapping files can be replicated and synchronized to remote data repositories for indexing and storage. Once indexed and stored in a remote system, the $MC^2$ device's data can be recreated and restored, in the event that the physical device damaged, destroyed, or replaced.

The $MC^2$ device also provides application and device publishing services for mobile devices. $MC^2$ resource publishing allows users to access applications and devices over wired and/or wireless connections as if they were locally installed or attached to the mobile device. Through the use of a unified client graphical user interface, users are able to interact with $MC^2$ resources and local applications and resources in a single workspace. The $MC^2$ client allows the mobile device to interact with the $MC^2$ device in different modes to include, but not be limited to, the following: display, input/output device, zero or thin client. Because of the $MC^2$ architecture, applications will run in their native formats on native hardware platforms without requiring the added overhead of binary translation.

In order to provide a context for the various aspects of the invention, the following discussion provides a brief, general description of a suitable computing environment in which the various aspects of the present invention may be implemented. A computing system environment is one example of a suitable computing environment, but is not intended to suggest any limitation as to the scope of use or functionality of the invention. A computing environment may contain any one or combination of components discussed below, and may contain additional components, or some of the illustrated components may be absent. Various embodiments of the invention are operational with numerous general purpose or special purpose computing systems, environments or configurations. Examples of computing systems, environments, or configurations that may be suitable for use with various embodiments of the invention include, but are not limited to, personal computers, laptop computers, computer servers, computer notebooks, hand-held devices, microprocessor-based systems, multiprocessor systems, TV set-top boxes and devices, programmable consumer electronics, cell phones, personal digital assistants (PDAs), network PCs, minicomputers, mainframe computers, embedded systems, distributed computing environments, and the like.

Embodiments of the invention may be implemented in the form of computer-executable instructions, such as program code or program modules, being executed by a computer or computing device. Program code or modules may include programs, objections, components, data elements and structures, routines, subroutines, functions and the like. These are used to perform or implement particular tasks or functions. Embodiments of the invention also may be implemented in distributed computing environments. In such environments, tasks are performed by remote processing devices linked via a communications network or other data transmission medium, and data and program code or modules may be located in both local and remote computer storage media including memory storage devices.

In one embodiment, a computer system comprises multiple client devices in communication with at least one server device through or over a network. In various embodiments, the network may comprise the Internet, an intranet, Wide Area Network (WAN), or Local Area Network (LAN). It should be noted that many of the methods of the present invention are operable within a single computing device.

A client device may be any type of processor-based platform that is connected to a network and that interacts with one or more application programs. The client devices each comprise a computer-readable medium in the form of volatile and/or nonvolatile memory such as read only memory (ROM) and random access memory (RAM) in communication with a processor. The processor executes computer-executable program instructions stored in memory. Examples of such processors include, but are not limited to, microprocessors, ASICs, and the like.

Client devices may further comprise computer-readable media in communication with the processor, said media storing program code, modules and instructions that, when executed by the processor, cause the processor to execute the program and perform the steps described herein. Computer readable media can be any available media that can be accessed by computer or computing device and includes both volatile and nonvolatile media, and removable and non-removable media. Computer-readable media may further comprise computer storage media and communication media. Computer storage media comprises media for storage of information, such as computer readable instructions, data, data structures, or program code or modules. Examples of computer-readable media include, but are not limited to, any electronic, optical, magnetic, or other storage or transmission device, a floppy disk, hard disk drive, CD-ROM, DVD, magnetic disk, memory chip, ROM, RAM, EEPROM, flash memory or other memory technology, an ASIC, a configured processor, CDROM, DVD or other optical disk storage, magnetic cassettes, magnetic tape, magnetic disk storage or other magnetic storage devices, or any other medium from which a computer processor can read instructions or that can store desired information. Communication media comprises media that may transmit or carry instructions to a computer, including, but not limited to, a router, private or public network, wired network, direct wired connection, wireless network, other wireless media (such as acoustic, RF, infrared, or the like) or other transmission device or channel. This may include computer readable instructions, data structures, program modules or other data in a modulated data signal such as a carrier wave or other transport mechanism. Said transmission may be wired, wireless, or both. Combinations of any of the above should also be included within the scope of computer readable media. The instructions may comprise code from any computer-programming language, including, for example, C, C++, C#, Visual Basic, Java, and the like.

Components of a general purpose client or computing device may further include a system bus that connects various system components, including the memory and processor. A system bus may be any of several types of bus structures, including, but not limited to, a memory bus or memory controller, a peripheral bus, and a local bus using any of a variety of bus architectures. Such architectures include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing and client devices also may include a basic input/output system (BIOS), which contains the basic routines that help to transfer information between elements within a computer, such as during start-up. BIOS typically is stored in ROM. In contrast, RAM typically contains data or program code or modules that are accessible to or presently being operated on by processor, such as, but not limited to, the operating system, application program, and data.

Client devices also may comprise a variety of other internal or external components, such as a monitor or display, a keyboard, a mouse, a trackball, a pointing device, touch pad, microphone, joystick, satellite dish, scanner, a disk drive, a CD-ROM or DVD drive, or other input or output devices. These and other devices are typically connected to the processor through a user input interface coupled to the system bus, but may be connected by other interface and bus structures, such as a parallel port, serial port, game port or a universal serial bus (USB). A monitor or other type of display device is typically connected to the system bus via a video interface. In addition to the monitor, client devices may also include other peripheral output devices such as speakers and printer, which may be connected through an output peripheral interface.

Client devices may operate on any operating system capable of supporting an application of the type disclosed herein. Client devices also may support a browser or browser-enabled application. Examples of client devices include, but are not limited to, personal computers, laptop computers, personal digital assistants, computer notebooks, hand-held devices, cellular phones, mobile phones, smart phones, pagers, digital tablets, Internet appliances, and other processor-based devices. Users may communicate with each other, and with other systems, networks, and devices, over the network through the respective client devices.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A non-transitory computer-readable storage medium with an executable program stored thereon, wherein the program instructs a processor or microprocessor to perform the following steps:
   receiving a request from a mobile or remote computing device to access a peripheral computing device;
   encapsulating data into proprietary frames for transmission over wired or wireless connections;
   authenticating the mobile or remote computing device;
   upon authenticating the mobile or remote computing device, forwarding the request from the mobile or remote computing device to the peripheral computing device, wherein the peripheral computing device is not connected to a network;
   routing binary data to memory address spaces, to processing units, or from processing units;
   providing memory management services;
   performing data synchronization with local or internal data repositories or external data repositories;
   providing application and device publishing services;
   providing data optimization, protection, or profiling services;
   providing file or block data mapping services;
   offloading data processing from the mobile or remote computing device;
   providing an internal data transport channel for communications between the mobile or remote computing device and the peripheral computing devices; and
   providing resource management services for peripheral computing devices.

2. The non-transitory computer-readable storage medium with an executable program stored thereon of claim 1, wherein the processor or microprocessor receives said request from one or more of the following: a portable computing device, a laptop computer, a personal digital assistant, a notebook computer, a cell phone, a smart phone, a pager, an Internet appliance, or a tablet computer.

3. The non-transitory computer-readable storage medium with an executable program stored thereon of claim 1, wherein the program further instructs the processor or microprocessor to perform the steps of:
   internally encrypting data;
   internally compressing data; and
   internally removing duplicate data.

4. A mobile or remote computing device comprising a microprocessor, wherein the microprocessor is programmed to:
- receive a request from an application on the mobile or remote computing device to access a non-networked physical peripheral device;
- identify the driver or drivers necessary for operation of the peripheral device;
- send the request to a peripherals aggregation device for subsequent processing and forwarding to the peripherals device;
- route binary data to memory address spaces, to processing units, or from processing units;
- provide memory management services;
- perform data synchronization with local or internal data repositories or external data repositories;
- provide file or block data mapping services;
- offload data processing from the mobile or remote computing device;
- provide an internal data transport channel for communications between the mobile or remote computing device and the peripheral computing devices;
- provide application and device publishing services;
- provide data optimization, protection, or profiling services; and
- provide resource management services for peripheral computing devices.

5. The device of claim 4, wherein the peripherals aggregation device is active.

6. The device of claim 4, wherein the peripherals aggregation device is passive.

7. The device of claim 4, wherein the processor or microprocessor is further programmed to provide authentication data for the mobile or remote computer device.

* * * * *